(12) United States Patent
Pacella et al.

(10) Patent No.: US 10,699,296 B2
(45) Date of Patent: Jun. 30, 2020

(54) NATIVE VIDEO ADVERTISING WITH VOICE-BASED AD MANAGEMENT AND MACHINE-TO-MACHINE AD BIDDING

(71) Applicant: Verizon Patent and Licensing Inc., Arlington, VA (US)

(72) Inventors: Dante J. Pacella, Charles Town, WV (US); Saravanan Mallesan, Fairfax, VA (US); Mani Tadayon, Leesburg, VA (US); Christopher N. DelRegno, Rowlett, TX (US); Gina Otts, Flower Mound, TX (US); Jean M. McManus, Bernardsville, NJ (US); Mark D. Carney, Sterling, VA (US)

(73) Assignee: Verizon Patent and Licensing, Inc., Basking Ridge, NJ (US)

(*) Notice: Subject to any disclaimer, the term of this patent is extended or adjusted under 35 U.S.C. 154(b) by 737 days.

(21) Appl. No.: 14/984,052

(22) Filed: Dec. 30, 2015

(65) Prior Publication Data

US 2017/0193548 A1  Jul. 6, 2017

(51) Int. Cl.

| G06Q 30/00 | (2012.01) |
|---|---|
| G06Q 30/02 | (2012.01) |
| H04M 3/42 | (2006.01) |
| H04M 3/493 | (2006.01) |

(52) U.S. Cl.
CPC ..... *G06Q 30/0251* (2013.01); *G06Q 30/0257* (2013.01); *G06Q 30/0267* (2013.01); *H04M 3/42382* (2013.01); *H04M 3/493* (2013.01)

(58) Field of Classification Search
CPC .......... G06Q 30/0251; G06Q 30/0257; G06Q 30/0267; H04M 3/42382; H04M 3/493

USPC ................................ 705/14.49, 14.55, 14.64
See application file for complete search history.

(56) References Cited

U.S. PATENT DOCUMENTS

| 6,438,579 | B1* | 8/2002 | Hosken | .................. G06Q 30/02 709/203 |
|---|---|---|---|---|
| 6,950,623 | B2* | 9/2005 | Brown | ................. G06Q 20/108 455/3.01 |
| 7,822,705 | B2* | 10/2010 | Xia | ......................... G06F 16/29 707/603 |
| 7,831,928 | B1* | 11/2010 | Rose | ..................... G06F 40/197 715/810 |

(Continued)

FOREIGN PATENT DOCUMENTS

EP        2306390 A1 *  4/2011  ............. G06Q 30/02

OTHER PUBLICATIONS

Melchenko, Liana. "Inferences in Advertising: A study of Swedish and Russian TV Commercials." Lind University: Department of Linguistics, Jan. 2003. (Year: 2003).*

*Primary Examiner* — Luis A Brown

(57) ABSTRACT

A method, a device, and a non-transitory storage medium provides storing user preferences pertaining to a native ad service; receiving a program that includes instances of native ad information indicative of instances of native ads; displaying the program; determining, whether instances of native ad information is received; providing the native ad based on the user preferences, in response to determining that the instances of native ad information is received; determining whether a secondary user device is paired; and transmitting instances of native ad information to the secondary user device in response to determining that the secondary user device is paired.

20 Claims, 18 Drawing Sheets

(56) References Cited

U.S. PATENT DOCUMENTS

| | | | | |
|---|---|---|---|---|
| 7,933,809 B2* | 4/2011 | Abraham | | G06Q 30/02 705/26.1 |
| 8,166,155 B1* | 4/2012 | Rachmeler | | G06F 11/3438 709/224 |
| 2002/0100042 A1* | 7/2002 | Khoo | | G06Q 30/02 725/34 |
| 2003/0110516 A1* | 6/2003 | Chang | | H04N 7/025 725/136 |
| 2005/0038900 A1* | 2/2005 | Krassner | | G06Q 30/02 709/231 |
| 2005/0278746 A1* | 12/2005 | Steelberg | | H04H 20/106 725/58 |
| 2006/0143066 A1* | 6/2006 | Calabria | | G06Q 30/0201 705/7.29 |
| 2007/0078671 A1* | 4/2007 | Dave | | G06Q 30/0282 706/45 |
| 2007/0192872 A1* | 8/2007 | Rhoads | | G06F 3/017 726/26 |
| 2007/0198344 A1* | 8/2007 | Collison | | G06Q 30/02 705/14.1 |
| 2007/0198921 A1* | 8/2007 | Collison | | G06Q 30/02 715/210 |
| 2008/0097835 A1* | 4/2008 | Weiser | | G06Q 30/02 705/306 |
| 2008/0154819 A1* | 6/2008 | Boies | | G06N 5/022 706/20 |
| 2008/0255989 A1* | 10/2008 | Altberg | | G06Q 20/102 705/40 |
| 2008/0275763 A1* | 11/2008 | Tran | | G06Q 30/0274 705/35 |
| 2008/0290987 A1* | 11/2008 | Li | | G06Q 30/02 340/5.1 |
| 2009/0018679 A1* | 1/2009 | Pina | | G11B 27/034 700/94 |
| 2009/0070228 A1* | 3/2009 | Ronen | | G06Q 30/0601 705/26.1 |
| 2009/0132391 A1* | 5/2009 | Jacobs | | G06Q 30/0601 705/26.1 |
| 2009/0217317 A1* | 8/2009 | White | | G06Q 30/02 725/32 |
| 2009/0292610 A1* | 11/2009 | Quach | | G06Q 30/02 705/14.49 |
| 2010/0010822 A1* | 1/2010 | Bal | | G06Q 30/02 705/1.1 |
| 2010/0070510 A1* | 3/2010 | Agarwal | | G06Q 30/02 707/748 |
| 2010/0095323 A1* | 4/2010 | Williamson | | H04H 20/30 725/32 |
| 2010/0125484 A1* | 5/2010 | Chen | | G06Q 30/02 705/7.32 |
| 2010/0287035 A1* | 11/2010 | Nemitz | | G06Q 10/06 705/14.61 |
| 2010/0312646 A1* | 12/2010 | Gupta | | G06Q 30/02 705/14.58 |
| 2011/0022966 A1* | 1/2011 | Rose | | G06F 3/0483 715/747 |
| 2011/0106630 A1* | 5/2011 | Hegeman | | G06Q 30/0206 705/14.71 |
| 2011/0125736 A1* | 5/2011 | Dave | | G06Q 10/10 707/723 |
| 2011/0208669 A1* | 8/2011 | Ruhl | | G06Q 30/02 705/347 |
| 2011/0244829 A1* | 10/2011 | Kase | | H04M 1/66 455/411 |
| 2011/0289453 A1* | 11/2011 | Takizawa | | H04N 5/4403 715/810 |
| 2012/0075083 A1* | 3/2012 | Isaacs | | H04M 3/42382 340/13.2 |
| 2012/0096486 A1* | 4/2012 | Stallard | | H04H 20/106 725/32 |
| 2012/0110608 A1* | 5/2012 | Berkowitz | | H04N 21/25435 725/14 |
| 2012/0150835 A1* | 6/2012 | Bobick | | G06N 5/022 707/706 |
| 2013/0066710 A1* | 3/2013 | Zimak | | G06Q 30/0241 705/14.43 |
| 2013/0308818 A1* | 11/2013 | MacIntosh | | G06T 1/0021 382/100 |
| 2014/0143698 A1* | 5/2014 | Kim | | G06F 3/0488 715/768 |
| 2014/0282695 A1* | 9/2014 | Bakar | | H04N 21/44016 725/32 |
| 2015/0058870 A1* | 2/2015 | Khanna | | H04N 21/2542 725/5 |
| 2015/0067739 A1* | 3/2015 | Kelley | | H04N 21/47205 725/60 |
| 2015/0289022 A1* | 10/2015 | Gross | | H04N 21/4725 725/51 |
| 2016/0241605 A1* | 8/2016 | Taboriskiy | | H04W 4/80 |
| 2017/0193548 A1* | 7/2017 | Pacella | | G06Q 30/0257 |

* cited by examiner

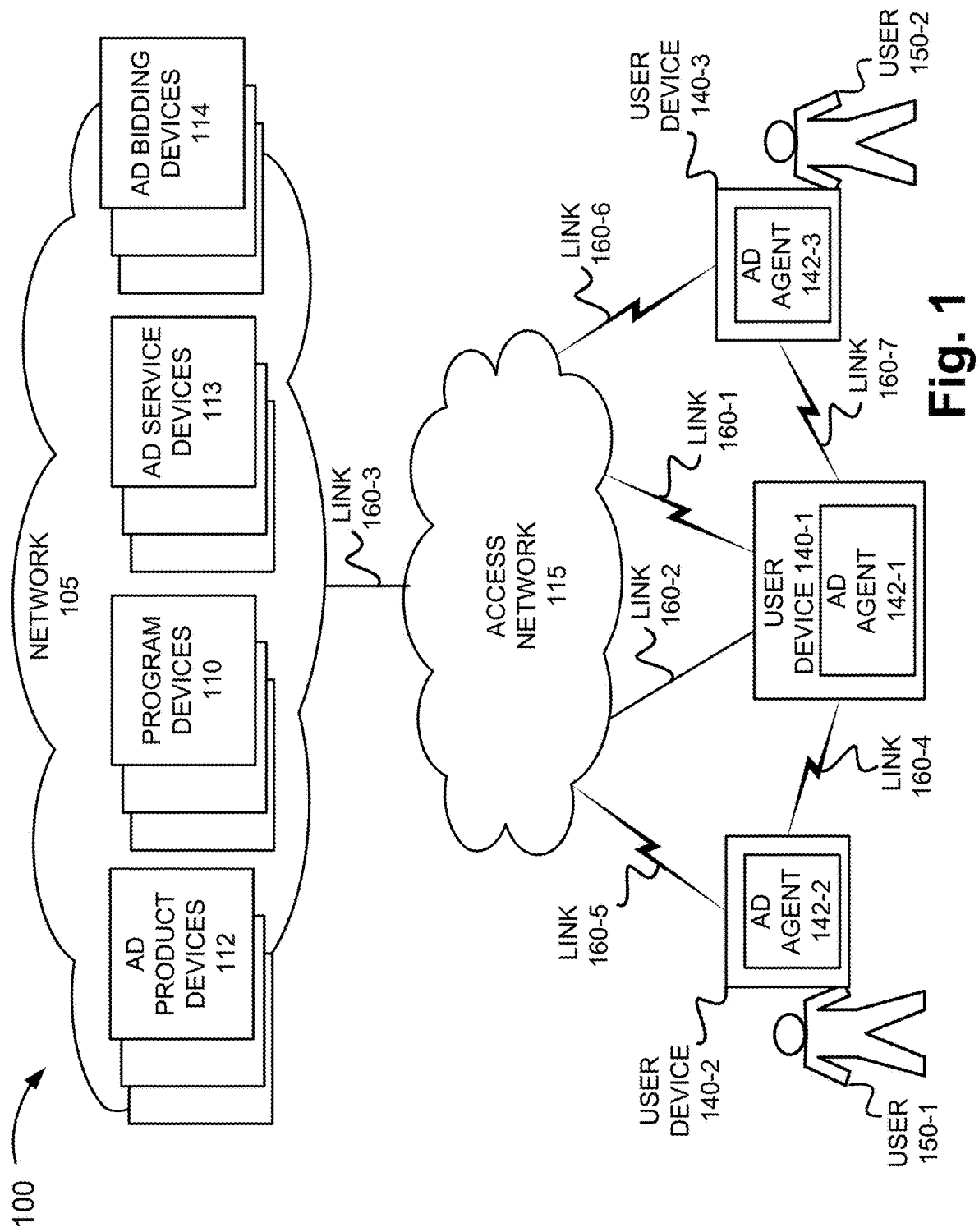

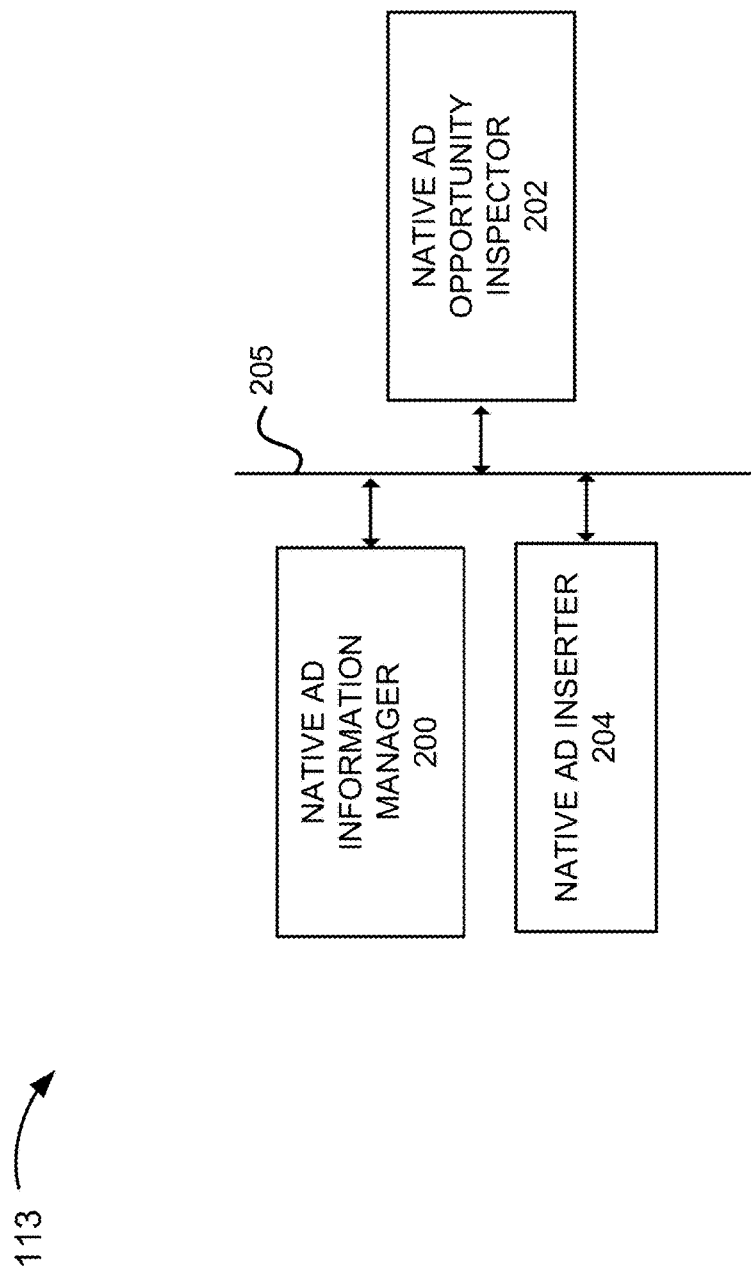

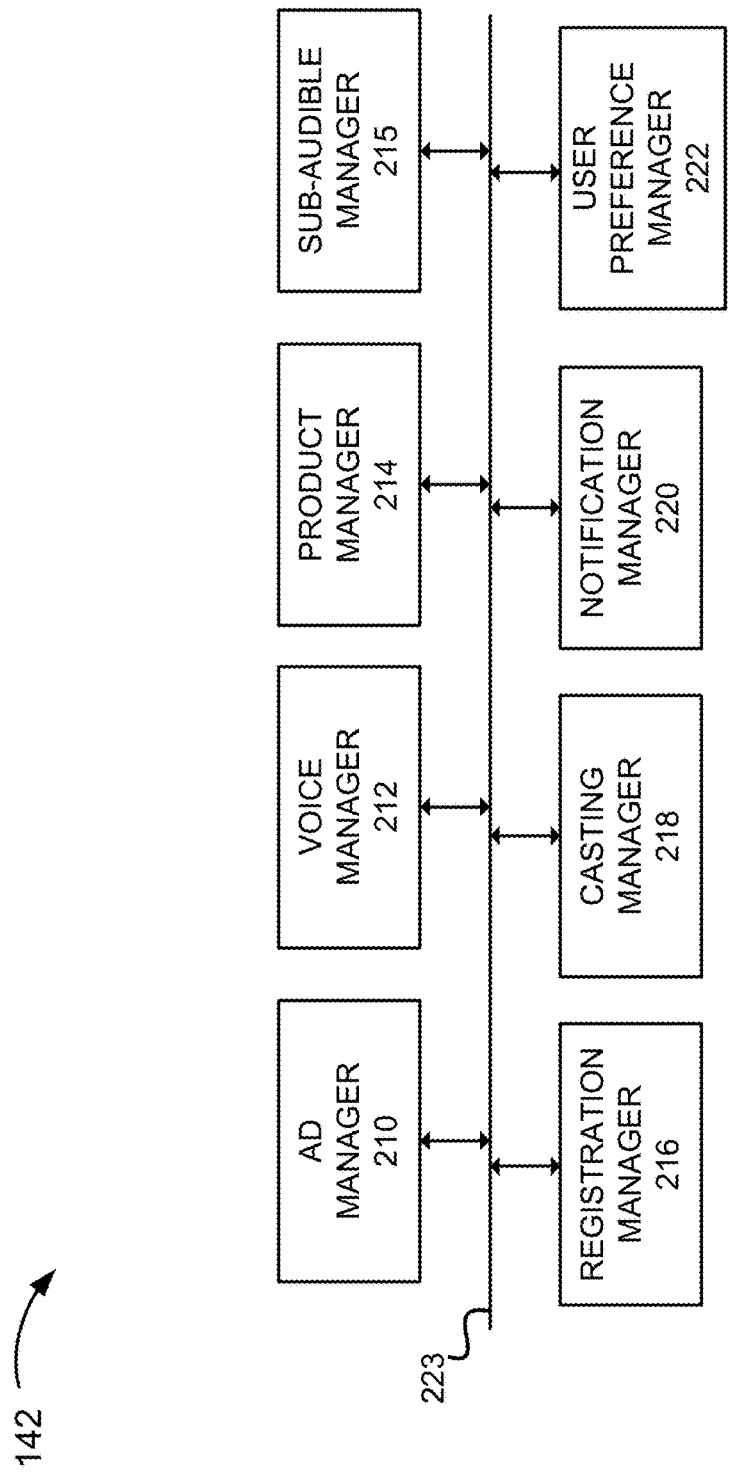

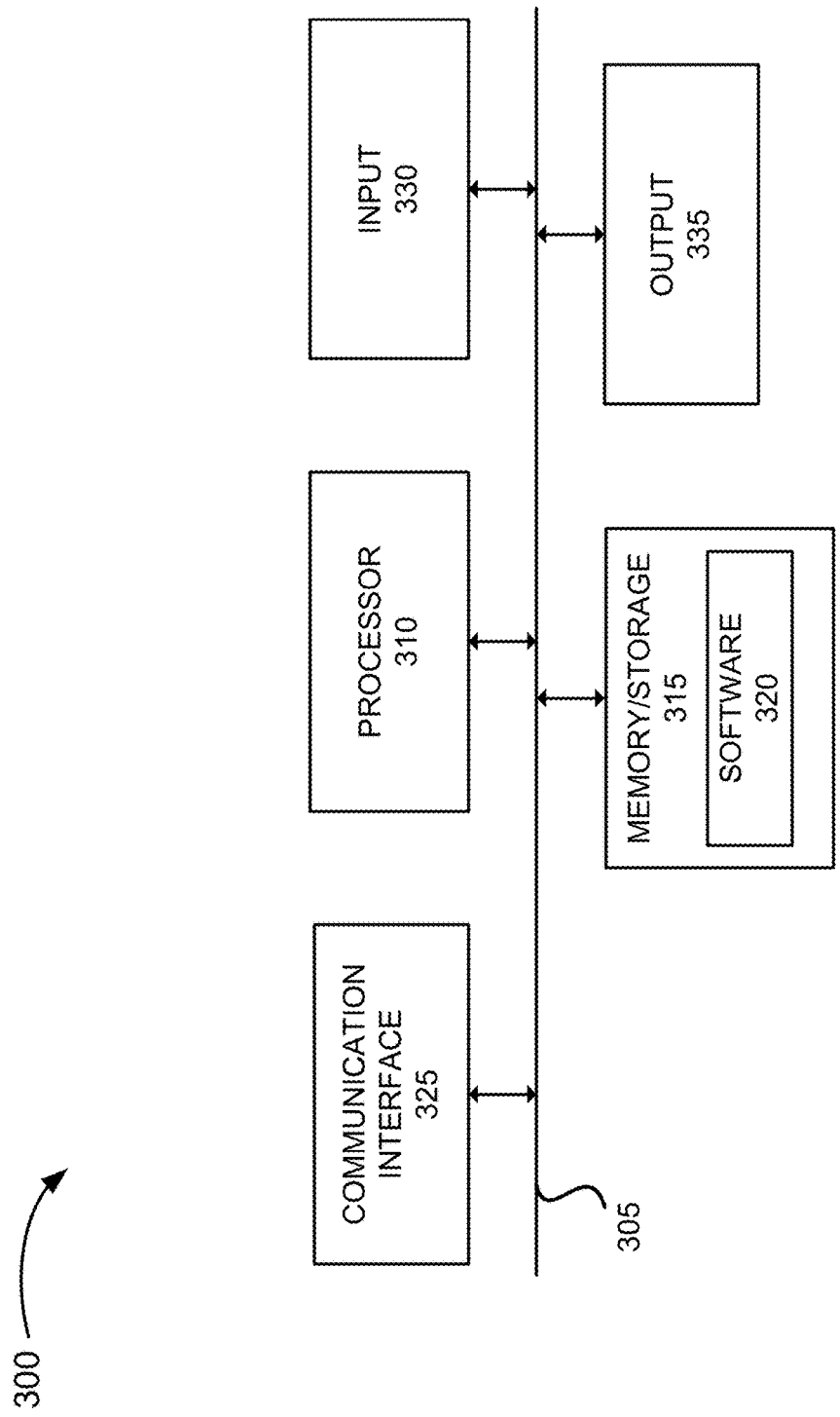

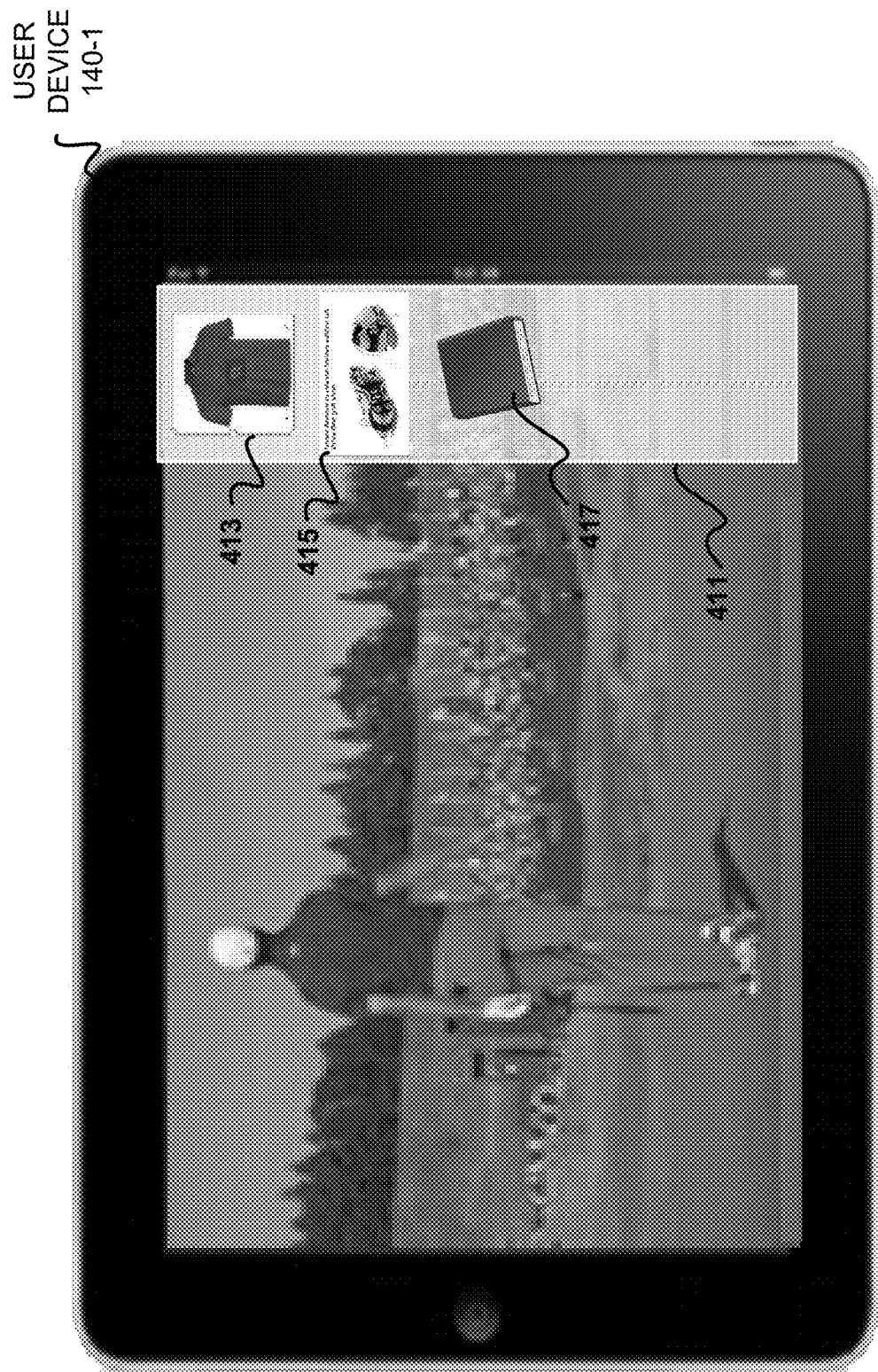

NATIVE VIDEO ADVERTISING WITH VOICE-BASED AD MANAGEMENT AND MACHINE-TO-MACHINE AD BIDDING

BACKGROUND

As video services move toward native advertising models, advertisers may be locked out of an embedded video platform or find it difficult to insert product placement types of native advertising.

BRIEF DESCRIPTION OF THE DRAWINGS

FIG. 1 is a diagram illustrating an exemplary environment in which an exemplary embodiment of native ad services provided by a native ad system may be implemented;

FIG. 2A is a diagram illustrating exemplary network elements of an ad service device depicted in the environment of FIG. 1;

FIG. 2C is a diagram of exemplary elements of an ad agent depicted in the environment of FIG. 1;

FIG. 3 is a diagram illustrating exemplary components of a device that may correspond to a network devices and a user device depicted in the environment of FIG. 1;

FIGS. 4A-4E are diagrams that illustrate exemplary graphical user interfaces of the native ad services.

DETAILED DESCRIPTION OF PREFERRED EMBODIMENTS

Figure 2B:
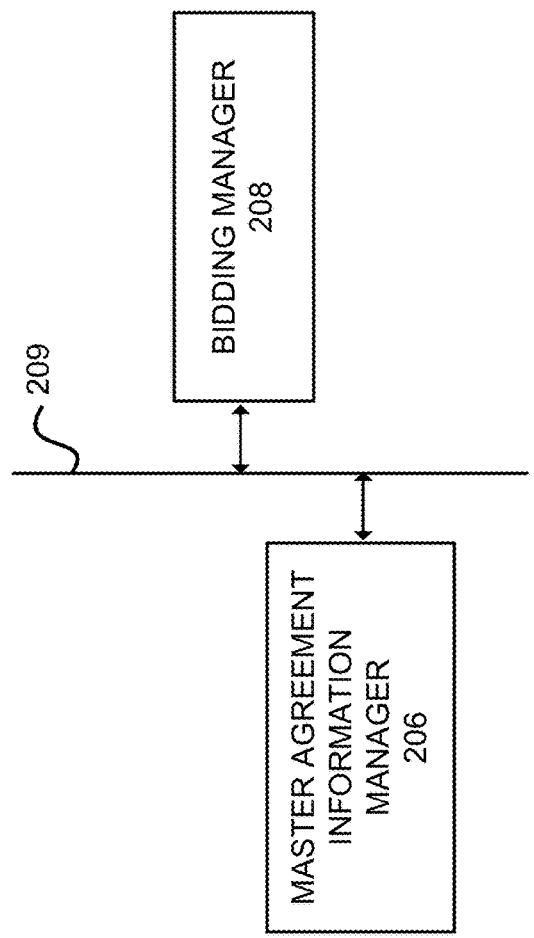
FIG. 2B is a diagram illustrating exemplary network elements of an ad bidding device depicted in the environment of FIG. 1.

The following detailed description refers to the accompanying drawings. The same reference numbers in different drawings may identify the same or similar elements. Also, the following detailed description does not limit the invention.

Native advertising is a type of advertising in which the advertisement (or "ad") experience matches the form and the function of the user experience in which the ad is placed. For example, a native ad may cohere and behave similar to other content in which it is immersed. When an ad partner, a content owner, a service subscriber, or other party does not wish to have a visual indication or presence of native or interactive advertising displayed with an image, regardless of its opacity, degree of obstruction and/or modification of the image, the ability to still provide an advertising solution can be quite challenging.

According to exemplary embodiments, devices and methods are described that are directed to native ad services. According to an exemplary embodiment, a native ad system provides users with the native ad services. The native ad system allows the users to manage native ads presented to the users via user devices. According to exemplary embodiment, the native advertising is product placement advertising in which a good or a service is presented within the context of video media. The product placement may be intentional product placement (e.g., by the content owner/creator) or related information applied without the cooperation of the content owner/creator. In this regard, the native ad services supports both curated content containing arbitrary product placement as well as dynamic insertion of advertising information based on either automatic content identification (e.g., image recognition, facial recognition, etc.) or via manual tagging live or after the fact.

According to an exemplary embodiment, the native ad system allows the user to select a placed product of interest, obtain product information pertaining to the selected product, and purchase the product when desired. According to an exemplary embodiment, the native ad system includes a primary user device and a secondary user device in which each user device includes a native ad agent. The native ad agents provide various functions pertaining to the native ad service, such as queuing and storing products for subsequent review by the user, automatic selection of products on behalf of the user, filtering of certain products, casting product information from the primary user device to the secondary user device, casting native ad information, fetching and storing of production information, posting product on social media, purchasing products, storing product in a cart of a wish list, product notifications, storing user preferences, and so forth.

According to an exemplary embodiment, when pairing between the primary user device and the second user device is not possible (e.g., due to capabilities of user device, no network in place, no messaging service application, etc.), native ad information is communicated from the primary user device to the secondary user device based on a sub-audible transmission. According to various implementations, sub-audible coding representative of the native ad information is embedded in the audio track of the program or provided on a separate audio track associated with the program. The secondary user device obtains the sub-audible coding carried by the sub-audible transmission via a microphone while the program is being played.

According to an exemplary embodiment, the native ad system includes a voice system. The voice system includes speech recognition logic that can understand various vocal commands from the user and carry out various operations that may govern the ad experience. According to an exemplary embodiment, the voice system includes voice recognition logic. The voice recognition logic may identify the user's voice relative to other users and provide a user-specific ad experience based on user preferences associated with the user.

According to an exemplary embodiment, the native ad system includes an ad opportunity platform that detects native ad opportunities within programs. According to an exemplary embodiment, the ad opportunity platform uses various technologies including voice pattern recognition, optical character recognition, closed caption recognition, facial recognition, image profile recognition, and/or subliminal optical pattern recognition to analyze the program and identify content that forms a basis of a native ad opportunity.

According to an exemplary embodiment, the native ad system includes a bidding platform for negotiating native ad opportunities. For example, in response to the ad opportunity platform detecting a native ad opportunity within the program, the bidding platform initiates a bidding process, which includes offering up the advertising opportunity in an auction to a participating ad partner. According to an exemplary embodiment, the bidding is performed according to a machine-to-machine architecture, in which each machine, on behalf of each party, negotiates native ad parameters associated with a native ad that will be used to fulfill the detected native ad opportunity. For example, one machine may be associated with the program service provider and the other machine may be associated with an ad partner of the product to which the native ad pertains. When the bidding results in an agreement being reached, the native ad system embeds native ad information, which provides the native advertising, with the program. For example, the ad partner may provide the native ad information used in support of the native ad to fulfill the native ad opportunity. According to an exemplary implementation, the detection, bidding, and insertion processes associated the native ad opportunity may be performed as a part of program transforming processes (e.g., transcoding, formatting, etc.) that occur before the program is delivered to users for consumption.

The term "program" as used herein, is intended to include a combination of audio data and visual data. The program may originate from various sources, such as, for example, a television service, an Internet service, a mobile service, etc. The program may be for example, television content, Internet content, user content, or other form of audio/video media. By way of further example, a program may be a movie, a television show, a sports event, video-on-demand (VoD) content, live content, pre-recorded content, premium channel content, pay-per-view (PPV) content, a music event, a podcast, a videocast, a webcast, a YouTube video, and so forth. The program is not an advertisement or a commercial. According to an exemplary embodiment, the program includes native advertising. According to an exemplary embodiment, the native advertising includes product placement. The product placement may be intentionally pre-placed in the program or not intentionally pre-placed (e.g., a product included in the program without advertising of the product contemplated by the program creator).

FIG. 1 is a diagram illustrating an exemplary environment 100 in which an exemplary embodiment of a native ad system may be implemented. As illustrated, environment 100 includes a network 105. Network 105 includes program devices 110, ad product devices 112, ad service devices 113, and ad bidding devices 114. Additionally, environment 100 includes an access network 115 and user devices 140-1 and 140-3 (also referred to as user devices 140 and, individually and generically as user device 140). User device 140-1 includes an ad agent 142-1, user device 140-2 includes an ad agent 142-2, and user device 140-3 includes an ad agent 142-3 (also referred to as ad agents 142 and, individually and generically as ad agent 142). User 150-1 is an operator of user device 140-2 and user 150-2 is an operator of user device 140-3 (also referred to as users 150 and, individually and generically as user 150).

As further illustrated, environment 100 includes communicative links 160-1 through 160-7 (also referred to collectively as links 160 and, generically and individually as link 160) among the networks and user devices 140. A network device may transmit and receive data via link 160. Similarly, user device 140 may transmit and receive data via link 160. Environment 100 may be implemented to include wireless (e.g., radio, optical, etc.) and/or wired (e.g., electrical, optical, etc.) links 160. A communicative connection between network devices and between user device 140 and, a network device and/or network may be direct or indirect via link 160. For example, an indirect communicative connection may involve an intermediary network device and/or an intermediary network not illustrated in FIG. 1. Additionally, the number of links 160, the type (e.g., wired, wireless, etc.) of links 160, and the arrangement of links 160 illustrated in environment 100 are exemplary. For example, although not illustrated, links 160 exist between network devices included in network 105.

A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device).

The number of network devices, the number of user devices, the number of networks, and the arrangement in environment 100 are exemplary. According to other embodiments, environment 100 may include additional network devices, fewer network devices, and/or differently arranged network devices, than those illustrated in FIG. 1. Additionally, or alternatively, according to other embodiments, environment 100 may include additional user devices 140. Additionally, or alternatively, environment 100 may include an additional networks, fewer networks, and/or arrangement of networks that is/are different from that illustrated in FIG. 1. For example, user devices 140 may be devices of a local area network (LAN). Additionally, or alternatively, one network may be combined with another network. For example, network 105 and access network 115 may be combined into a single network.

Network 105 includes one or multiple networks of one or multiple types. Network 105 may be implemented as a satellite-based network, a terrestrial-based network, or a combination thereof. Network 105 may be implemented to include a television distribution network, a mobile network, a program streaming network, or other suitable network (e.g., the Internet, a vehicular communication network, etc.) for providing programs that include native advertising to users. According to an exemplary implementation, network 105 provides a program service in which users subscribe to and/or pay for the program service. For example, the program service may be a television service or a program streaming service. According to other exemplary implementations, network 105 provides a program service in which users do not subscribe to and/or pay for the program service. For example, the program service may be a free service available to any user via the Internet and so forth. Network 105 may be implemented to deliver programs using various technologies, such as an optical architecture, a coaxial cable architecture, an Internet Protocol (IP) TV architecture, a digital subscriber line (DSL) architecture, a wireless architecture, an Internet-based architecture, or some combination thereof. Depending on the architecture implemented, network 105 may include various types of program distribution devices and other types of devices that contribute to the program service, such as, billing devices, security devices, customer profile devices, and application server devices. By way of further example, network 105 may include super headend (SHE) devices, video hub office (VHO) devices, video serving office (VSO) devices, routers, gateway devices, interactive programming guide devices, load balancer devices, switching devices, splitter devices, passive optical network (PON) devices, web servers, and so forth.

Program devices 110 include network devices that include logic to store programs and make them available for delivery to users for consumption. Depending on the architecture implemented, program device 110 may be implemented as a network computer, a web server, an application server, a streaming server, an origin server, a media server, a video server, and so forth. Each program device 110 may include a mass storage device that stores programs. The programs may be stored in various resolutions, bitrates, compressions, encodings/decodings, frame rates, aspect ratios, languages, sample rates, and so forth, that may be played on various players according to various player languages, formats, etc.

Ad product devices 112 include network devices that include logic to store product information about products or services included in programs and make the product information available to users. For example, product information may include any information that assists users to have commercial interactions (e.g., purchase, rent, etc.) with the products or services. As an example, when the product is a shirt, the product information may store the sizes available, colors available, materials included in the shirt, price of the shirt, an image of the shirt, a description of the shirt, style of the shirt, an image of a person wearing the shirt, a shirt identifier or code, care information (e.g., machine washable, dry cleaning, etc.), and so forth. The product information may also include, for example, discount information, sale information, coupon information, etc., pertaining to the shirt. Ad product devices 112 may also include logic that allows users to purchase the products. Each ad product device 112 may include a mass storage device that stores the product information. Depending on the product, the product information includes text, images, and/or audio/videos pertaining to the product. Ad product device 112 may be implemented as a network computer, a web server, an application server, or other suitable type of network device. By way of further example, ad product device 112 may be implemented as a web site (e.g., a retailer's web site, a manufacturer's web site, etc.), a network device associated with an ad brokerage service, etc.

Ad service devices 113 include network devices that include logic that provides native ad services from the backend (e.g., the network-side). FIG. 2A is a diagram illustrating exemplary functional components of ad service device 113. Referring to FIG. 2A, each ad service device 113 includes a native ad information manager 200, a native ad opportunity inspector 202, and a native ad inserter 204. According to other exemplary embodiments, ad service device 113 may include additional, fewer, and/or different functional components than those illustrated in FIG. 2A and described herein. Additionally, or alternatively, multiple functional components of ad service device 113 may be combined into a single functional component and/or a single functional component may be implemented as multiple functional components in which a process or a function may be collaboratively performed or multiple processes or functions may be split between them. Native ad information manager 200, native ad opportunity inspector 202, and/or native ad inserter 204 may be connected to and communicate with each other via a link 205.

Native ad information manager 200 includes logic of a database management system (DBMS). The DBMS may be implemented using conventional, well-known, or commercially available relational or NoSQL software/packages (e.g., Microsoft SQL, Oracle Database, Cassandra, MongoDB, etc.). Native ad information manager 200 stores native service information in a database. Native ad information manager 200 includes a mass storage device that stores the database. The native service information may include various types of information, product information (e.g., images of the product, a product description, etc.) and native ad information (e.g., a product identifier, a uniform resource identifier (URI) of a network device that stores production information (e.g., ad product device 112), or the URI of the network device and the string of the URI also includes the product identifier). The native ad information may be provided to the program service provider by the ad partner (e.g., an ad sponsor, a manufacturer/distributer of a product (e.g., Nike, Coca Cola, etc.), etc.). The program service provider may also store other types of information as native service information. For example, native service information may include various types of insertion information, such as a program identifier, date, time, frame numbers or segment identifier during which the product/native advertising occurs, etc. Additionally, the native service information may include ad correlation information. For example, ad correlation information may include image data pertaining to a person (e.g., the person's face, etc.) affiliated with a product, a character (e.g., a non-person) affiliated with a product, an audio excerpt affiliated with a product, and/or other object (e.g., a trademark, a logo, etc.), a landscape, etc., that may be associated with the product. For example, the person may be a spokesperson for a product or the character may be computer-generated figure (e.g., Geico lizard, etc.), the audio may describe a sale of a specific product, the logo may be associated with a specific company URI or coupon, an object may be a special limited edition product for buying now only, etc. Native service information may also include time-based, regional-based, or demographic-based offers. Additionally, native service information can be updated at any time prior, during or post ad viewing. When updated post ad view, the new information won't be relevant unless the user's action is deferred (queued) or the program is replayed and a new query is made to native ad information manager 200 by user device 140.

According to an exemplary embodiment, as a part of an ingestion process or a transformation process (e.g., transcoding, etc.) of programs received from content creators (e.g., movie or television studios, news outlets, parties who generate user-generated content (UGC), websites, blog sites, etc) and stored in a mass storage device, native ad opportunities are detected before the programs are delivered or made available to users. As illustrated in FIG. 2A, each native ad service device 113 includes native ad opportunity inspector 202. Native ad opportunity inspector 202 includes logic that analyzes programs and determines whether there are any native ad opportunities based on the analysis. By way of example, as a part of a transcoding process performed in series or a process performed in parallel with the transcoding process, native ad opportunity inspector 202 analyzes or scans a program to detect whether there are any native ad opportunities contained in the program. According to an exemplary embodiment, native ad opportunity inspector 202 uses various technologies including auditory recognition (e.g., voice pattern recognition, voice recognition, speech recognition, etc.), optical character recognition, closed caption recognition, facial recognition, image profile recognition, marker-based image processing and recognition, and/or subliminal optical pattern recognition to analyze the program and identify content that forms a basis of a native ad opportunity.

Figure 2D:
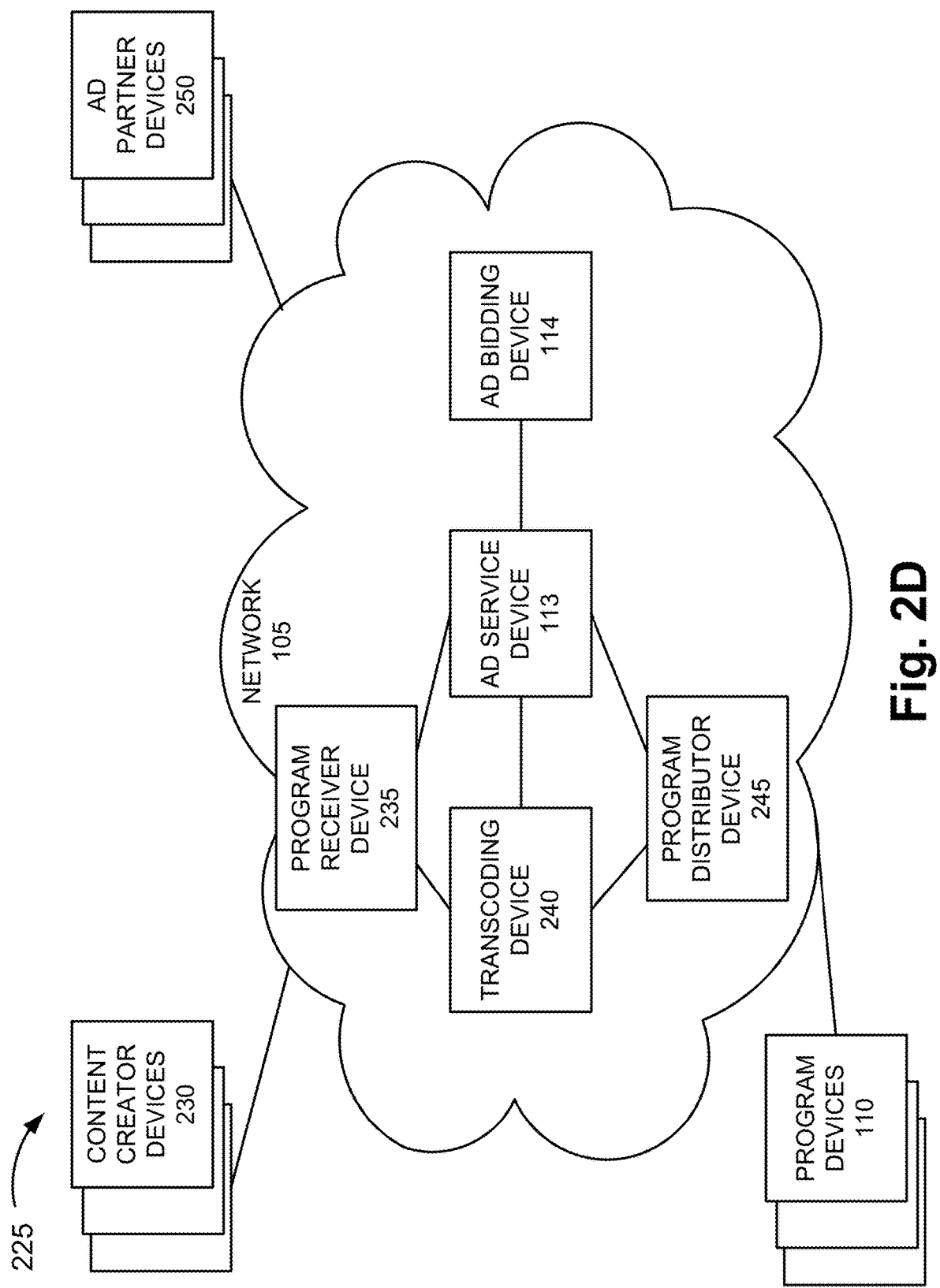
FIG. 2D is a diagram of another exemplary environment in which an exemplary embodiment of native ad services may be implemented.

FIG. 2D is a diagram of an exemplary environment 225 in which native ad services may be implemented. As illustrated, environment 225 includes content creator devices 230, a program receiver device 235, a transcoding device 240, a program distributor device 245, and ad partner devices 250. Environment 225 may be implemented within environment 100. Network 105, ad service device 113, and ad bidding device 114 has been previously described. The links between the network devices depicted in FIG. 2D are exemplary. Additionally, the number of network devices, the number of networks, and the arrangement in environment 225 are exemplary.

Figure 2E:
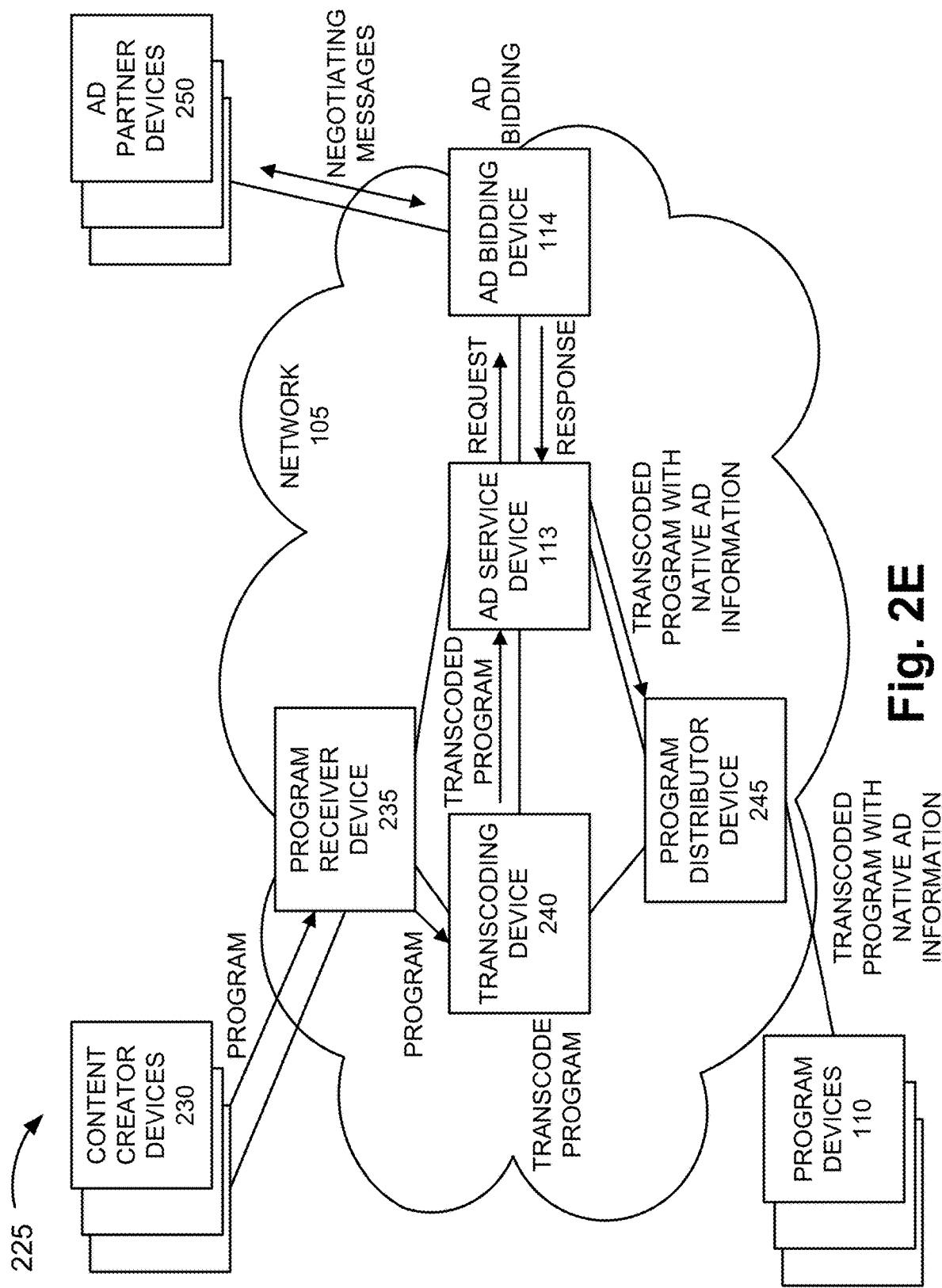
FIG. 2E is a diagram illustrating an exemplary workflow of native ad services performed in series.
Figure 2F:
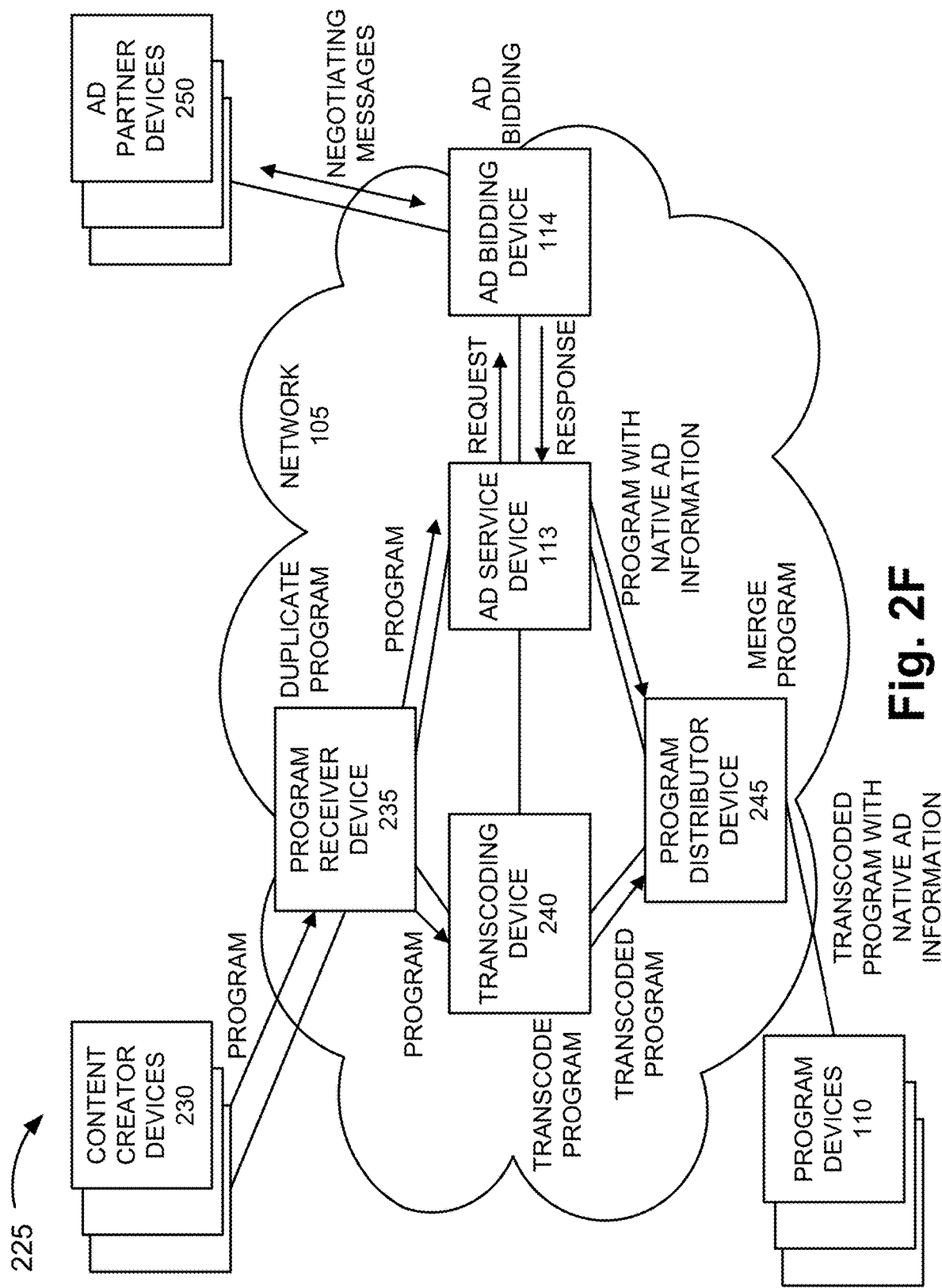
FIG. 2F is a diagram illustrating an exemplary workflow of native ad services performed in parallel.

According to various embodiments, the identification of native ad opportunities, ad bidding, and/or insertions of native ad information may be performed in series relative to transcoding of programs or in parallel relative to the transcoding of programs. FIG. 2E is a diagram illustrating an exemplary workflow for performing ad service processes in series with transcoding. FIG. 2F is a diagram illustrating an exemplary workflow for performing the ad service processes in parallel with transcoding. Referring to FIGS. 2A and 2D-2F, native ad service processes are described.

Content creator devices 230 include network devices that are source devices for providing programs and may be associated with content creators, as described herein. Content creator device 230 includes logic to store and provide a program via a push and/or pull method to program receiver device 235.

Program receiver device 235 includes a network device to initially receive programs from content creator devices 230. Program receiver device 235 includes logic to receive and store a program via a push and/or pull method from content creator devices 230. As previously described, according to various embodiments, the identification of native ad opportunities, insertion of the native ad information, and ad bidding may be performed in parallel to the transcoding of a program or in a serial manner. For example, for a live program, the ad service processes may be performed in parallel with transcoding. According to another example, when the time period to distribute the program affords a longer time period, the ad service processes may be performed in series with transcoding. Depending on the workflow, program receiver device 235 may operate differently. For example, referring to FIG. 2E, when the native ad processes are performed serially, program receiver device 235 includes logic to transmit or pass the initially received program to transcoding device 240. Thereafter, subsequent to transcoding device 240 performing various transcoding operations, transcoding device 240 may transmit or pass the transcoded program to ad service device 113. Ad service device 113 may perform various processes, as described herein. However, referring to FIG. 2F, when the ad service processes are performed in parallel, program receiver device 235 includes logic to transmit or pass the initially received program to both transcoding device 240 and ad service device 113. In this way, transcoding device 240 and ad service device 113 has an original or a copy of the program to perform various processes. In this regard, program receiver device 235 includes logic to generate a copy or a duplicate of the program. According to an exemplary implementation, program receiver device 235 may include logic to determine which workflow to select (e.g., parallel or serial) based on the type of program (e.g., live versus pre-recorded, etc.) and/or other types of information associated with the program. According to another exemplary implementation, program receiver device 235 may be configured for one type of workflow and receive only programs (e.g., from particular content creator devices 230) configured to its corresponding workflow. According to yet another exemplary implementation, an intermediary network device (not illustrated) may include logic to make such determinations and transmit or pass the program to program receiver device 235.

Transcoding device 240 includes a network device that includes logic to perform various transcoding operations on programs. For example, as previously described, programs may be transformed according to various criteria, such as resolutions, bitrates, compressions, encodings/decodings, frame rates, aspect ratios, languages, sample rates, and so forth. Depending on the workflow, transcoding device 240 may operate differently. For example, referring to FIG. 2E, when the ad service processes are performed serially, transcoding device 240 includes logic to transmit or pass the transcoded program to ad service device 113. However, referring to FIG. 2F, when the ad service processes are performed in parallel, transcoding device 240 includes logic to transmit or pass the transcoded program to program distributor device 245.

Program distributor device 245 includes a network device that includes logic to transmit or pass the transcoded program with native ad information to program devices 110. Depending on the workflow, program distributor device 245 may operate differently. For example, referring to FIG. 2E, when the ad service processes are performed serially, program distributor device 245 may receive the transcoded program with native ad information from ad service device 113. Thereafter, program distributor device 245 may transmit or pass the transcoded program with native ad information to program device 110. However, referring to FIG. 2F, when the ad service processes are performed in parallel, program distributor device 245 may receive a transcoded program from transcoding device 240 and a program with native ad information from ad service device 113. Upon receiving the program or a common portion of the program thereof from each network device, program distributor device 245 includes logic to merge the program data associated with each instance of the program together. Depending on the native ad insertion process, the merging of the program instances may be different. For example, when the native ad information is inserted to a dedicated track versus a main track, program distributor device 245 may encode or package the native ad information with the transcoded program. Program distributor device 245 may also edit a manifest file associated with the program to indicate frames or chunks that include the native ads. Program distributor device 245 may also edit the manifest file to indicate the native ad values. For example, the manifest may indicate a mapping between frames or chunks with the native ad values and/or native ad objects having native ad values. According to an exemplary implementation, the program may include placeholders or native ad spaces within which native ad information may be overlayed or inserted.

Ad partner devices 250 include network devices that are associated with ad partners and include logic to participate in ad bidding with ad bidding device 114. For example, ad partner devices 250 include logic to receive negotiating messages from ad bidding device 114 pertaining to native ad opportunities. The negotiating messages may include an offer, a counter offer, an acceptance, and so forth.

Referring to ad service device 113, in response to receiving the program from program receiver device 235 or a transcoded program from transcoding device 240, ad service device 113 performs various native ad services. According to an exemplary implementation, native ad opportunity inspector 202 may use information stored in the database of native ad information manager 200 (e.g., native service information) to determine whether a native ad opportunity exists within the program. For example, native ad opportunity inspector 202 may use the information to determine whether a match exists between content included in the program with information stored in the database. By way of further example, native ad opportunity inspector 202 analyzes the audio track of the program to identify a person, a phrase, a word, etc., that may directly or indirectly relate to a product and/or an ad partner with which the program service provider has a business relationship, and/or closed caption data to identify whether a word, a phrase, etc., directly or indirectly relates to the product or the ad partner. Additionally, for example, native ad opportunity inspector 202 may analyze the video track of the program using various technologies (e.g., optical character recognition, facial recognition, etc.) to identify any image data that directly or indirectly relates to the product or the ad partner. As a further example, assume that native ad opportunity inspector 202 identifies LeBron James in a program based on facial recognition. In response, native ad opportunity inspector 202 searches for a Nike logo or other Nike-related presence (e.g., visually and/or auditorily) in proximity to LeBron James' presence based on ad correlation information that indicates LeBron James has a business relationship (e.g., spokesperson in commercials for Nike products) with Nike.

When native ad opportunity inspector 202 determines that a native ad opportunity exists, native ad opportunity inspector 202 communicates with ad bidding device 114 to invoke an ad bidding service of the native ad services. According to an exemplary implementation, native ad opportunity inspector 202 provides ad bidding device 114 various types of information associated with the program, the product, the ad partner, etc., such as product information (e.g., product identifier, etc.) when available, ad correlation information, and insertion information. Native ad opportunity inspector 202 may also provide other types of information stored by other network devices (not illustrated). For example, native ad opportunity inspector 202 may provide viewership information pertaining to the program. For example, the viewership information may include various viewership metrics such as a popularity rating, performance history (e.g., number of potential viewers, devices, homes, type of devices, etc.), and so forth. Additionally, native ad opportunity inspector 202 may provide transactional information. For example, the transactional information may include an ad partner identifier that indicates the ad partner associated with the product or can be used by ad bidding device 114 to select ad bidding device 114 associated with the ad partner. The transactional information may also include a type of program parameter, which indicates a type of program within which the native ad opportunity exists, or a time limit parameter that indicates a time period during which the bidding must be completed. For example, when the program is a live program, there are time constraints pertaining to the bidding. According to such an example, when the type of program parameter indicates that the program is a live program, or the time limit parameter indicates a short time value (e.g., 300 milliseconds or other suitable time period value), ad bidding device 114 will limit the time period to negotiate with ad bidding device 114 of the ad partner so as to avoid unnecessary delay in delivering the live program and native ad to users. According to other examples, the program may be a recorded program or the time period before the program is delivered to users may be hours or even days. The type of program parameter and/or the time limit parameter may each carry an appropriate value reflective of the circumstances. As illustrated in FIGS. 2E and 2F, ad service device 113 may transmit a request to ad bidding device 114, which carries various types of information, as described herein.

Native ad inserter 204 includes logic that inserts native ads into programs based on the native ad information stored by native ad information manager 200, information obtained from the ad partner, information obtained from bidding manager 208 of ad bidding device 114, and so forth. For example, as illustrated in FIGS. 2E and 2F, a response transmitted by ad bidding device 114 to ad service device 113 may carry information resulting from the ad bidding process. Alternatively, if the native ad information is universal and can be queried from an authentic list, the native ad information can be obtained just-in-time. In response to ad bidding device 114 reaching an agreement, native ad inserter 204 inserts native advertising with the particular program. For example, referring to FIG. 2E, when the workflow is performed serially, native ad inserter 204 of ad service device 113 may insert the native ad information in the transcoded program. However, referring to FIG. 2F, when the workflow is performed in parallel, native ad inserter 204 may insert the native ad information in the program received from program receiver device 235. According to various implementations, native ad inserter 204 may embed native ad information into an audio track (e.g., sub-audible codes), video track, a separate track, etc., of the program. According to an exemplary implementation, a sub-audible code is indicated with a start-and-stop repeating sequence of a series of sub-audible tones that represent the native information. The sub-audible code may be embedded multiple times in the audio track to ensure that the sub-audible code is properly received by user devices 140. According to an exemplary embodiment, the term "sub-audible" is intended to mean any tone not discernible to an average listener when listening to the main audio track of a program at a normal or average listening volume. For example, the sub-audible tone may be a frequency above or below the human audible range (e.g., human audible range of 20-20 kHz). Alternatively, the sub-audible tone may be a frequency within the human audible range (e.g., 25-75 Hz, 19 kHz-21 kHz, etc.). The sub-audible code may be implemented in various ways based on various factors, such as frequency, amplitude, equal-loudness contours, frequency response of a microphone of user device 140, frequency response of a speaker of user device 140, and so forth.

Native ad inserter 204 identifies the program and may identify a segment within the program, etc., for native ad insertion to be correctly performed. According to an exemplary embodiment, native ad inserter 204 includes logic to analyze the audio track of the program to identify an insertion spot for the sub-audible code. For example, at any given instance, the audio track of the program may include various audio data, such as speech (e.g., dialogue of an actor, etc.), a sound effect, music, silence, and so forth. Depending on the audio data present during the native ad as well as the frequency and amplitude of the sub-audible tones used to convey the native ad information (i.e., the sub-audible code), native ad inserter 204 will select an appropriate timeslot to insert the sub-audible code to minimize interference and maximize successful conveyance of the sub-audible code to secondary user devices. According to an exemplary implementation, native ad inserter 204 may insert the sub-audible code during a timeslot that is time-shifted from the native ad. For example, the product of the native ad may be included in the video data during a time period of x through x+2 and then ends, and native ad inserter 204 inserts the sub-audible code during a time period of (x+2)+1 through (x+2)+2 (i.e., subsequent to the ending of the native ad in the video data). Alternatively, native ad inserter 204 inserts the sub-audible code during a time period before the appearance of the native ad, or partially before and during, during and partially after, and so forth. The sub-audible code may include a time-shift parameter that includes data, which is conveyed by sub-audible tones, indicating the time-shift period relative to the start of the native ad included in the video data. According to yet another exemplary implementation, the audio track may include pre-configured timeslots during which native ad inserter 204 may insert sub-audible codes. According to still other exemplary implementations, native ad metadata embedded into the program may be just a pointer to where the actual detailed information can be fetched. Ad agent 142 of user device 140 may fetch the native ad information in real-time based on the embedded pointer information. Native ad inserter 204 may perform this function in parallel with normal video transcoding.

According to another exemplary embodiment, native ad information may not be inserted into the program (e.g., no preprocessing of the program for a native ad). Rather, when user 150 expresses an interest in a product or a service presented during the program (e.g., via an input (e.g., vocal, touch, etc.), ad agent 142 may identify the product based on the input and search for relevant information (e.g., offline processing) and provide user 150 with any and all information gleaned from such search. The identification of the product may include capturing image data and/or audio data from the program in response to the input, and when the product is not inherently identified (e.g., a logo, a word, etc.) based on the captured data, ad agent 142 may query a central database based on the captured data to identify the product, and so forth.

Referring to FIG. 1, ad bidding devices 114 include network devices that include logic to negotiate an agreement, between parties, pertaining to an ad opportunity associated with a program. For example, the parties include the program service provider and an ad partner, and each party has a corresponding ad bidding device 114. The program service provider and the ad partner may have a master agreement in place that set forth various terms and conditions including ad bidding parameters. The ad bidding parameters pertain to native advertising opportunities. According to an exemplary embodiment, upon receiving a communication from ad service device 113 to initiate bidding, ad bidding device 114 includes logic to negotiate the purchase of the ad opportunity.

FIG. 2B is a diagram illustrating exemplary functional components of ad bidding device 114. Referring to FIG. 2B, each ad bidding device 114 includes a master agreement information manager 206 and a bidding manager 208. According to other exemplary embodiments, ad bidding device 114 may include additional, fewer, and/or different functional components than those illustrated in FIG. 2B and described herein. Additionally, or alternatively, multiple functional components of ad bidding device 114 may be combined into a single functional component and/or a single functional component may be implemented as multiple functional components in which a process or a function may be collaboratively performed or multiple processes or functions may be split between them. Master agreement information manager 206 and bidding manager 208 may be connected to and communicate with each other via a link 209.

Master agreement information manager 206 includes logic of a DBMS. The DBMS may be implemented using conventional, well-known relational or NoSQL, or commercially available software/packages (e.g., Microsoft SQL, Oracle Database, Cassandra, MongoDB, etc.). Master agreement information manager 206 stores master agreement information pertaining to different ad partners in a database. Master agreement information manager 206 includes a mass storage device that stores the database. The master agreement information includes ad bidding parameters. For example, the ad opportunity may provide a basis to negotiate terms relative to the presentment of the native ad, user impressions (e.g., users interaction with or taking advantage of the native ad once presented; click-through, click-through rate, etc.), and post-click-through impressions (e.g., purchases, inquiries, etc.). The negotiable terms may be based on various factors, such as actual or estimated viewership, historical data pertaining to viewership, screen real estate (e.g., size of product placement, place on screen (e.g., center, bottom, etc.), etc.), and so forth.

Bidding manager 208 includes logic to negotiate values for negotiable terms relative to a native ad opportunity. Bidding manager 208 includes logic to analyze product information, ad correlation information, insertion information, viewership information, and/or transactional information, to determine values for the ad bidding parameters. The values of the ad bidding parameters may have preset ranges or may have pre-configured values based on the analysis of the information and circumstances surrounding the native ad opportunity. Bidding manager 208 may transmit an offer message that carries ad bidding parameters and their values, along with other information (e.g., viewership information, etc.) to the ad partner's bidding manager 208. In response to receiving the offer message, the ad partner's bidding manager 208 analyzes the offer message, may accept the offer, propose a counter-offer, and so forth. The bidding process may include an exchange of two or more messages, which may result in an acceptance or a rejection of the native ad opportunity. By way of example, bidding manager 208 may request $20 per click-through for fewer than 10,000 click-throughs. According to another example, bidding manager 208 may request $10,000 to present the native ad for a program with a viewership history of over 50,000 viewers. According to another example, bidding manager 208 may not accept less than $20 per view for programs with current viewership of 50,000.

As previously mentioned, the bidding between bidding managers 208 may take place in real-time or near real-time in order preserve the timely delivery of programs and avoid or minimize delay that would negatively impact the program service, particularly when programs are live or linear. Alternatively, the bidding between bidding managers 208 may not be subject to such time constraints. When bidding results in an agreement between the parties, bidding manager 208 communicates to ad service device 113 (e.g., native ad inserter 204) to insert the native ad information associated with the native ad opportunity in accordance with the agreed upon terms. Alternatively, when bidding does not result in an agreement, bidding manager 208 communicates to ad service device 113 (e.g., native ad opportunity inspector 202) to discard the native ad opportunity since no agreement was reached.

When the native ad and the program are delivered to users, the program service provider may accumulate data pertaining to user impressions, click-throughs, etc., using various network devices (not illustrated in FIG. 1). Revenue generation can be audited by using a universal application programming interface (API) for a storefront. According to other scenarios, bidding situations may arise. For example, assume that a program included a native ad opportunity that was missed by the native ad system. Subsequent to the delivery of the program to users, the ad partner identifies the native ad opportunity and contacts the program service provider. Assume that the program service provider has stored the program for on-demand viewing by users. According to this example, ad service device 113 and ad bidding device 114 may perform similar tasks, as described above, to identify the native ad opportunity, negotiate ad bidding parameters, insert a native ad, etc. According to an exemplary implementation, a network device of the ad partner may communicate with ad service device 113 to initiate this process. For example, the network device may transmit a request that carries a program identifier, a timeslot during which the native ad opportunity exists, an ad partner identifier, a product identifier, etc. Other parameters may impact the bidding process, such as the lifetime of the program (e.g., duration of program availability to users as an on-demand program), actual viewership information since the program has already been delivered to users, etc.

Referring to FIG. 1, access network 115 includes one or multiple networks of one or multiple types. For example, access network 115 may be implemented to include a terrestrial network, a satellite network, a wired network, and/or a wireless network. According to an exemplary implementation, access network 115 includes a radio access network (RAN). The RAN may be a 3rd Generation (3G) RAN, a 3.5G RAN, a Fourth Generation (4G) RAN, a 4.5G RAN, a future generation wireless network architecture, etc. Depending on the implementation, access network 115 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. Access network 115 may include a wired network. For example, access network 115 may include an optical network or a cable network that includes various network devices, such as optical network termination (ONT) devices, pedestals, routers, switches, customer premises equipment, and so forth. Although not illustrated, access network 115 may be connected to a core network. For example, the core network includes a complimentary network pertaining to the one or multiple RANs described above. For example, the core network may include the core part of an LTE network, an LTE-A network, etc. Depending on the implementation, the core network may include various network elements, such as a gateway, a support node, a serving node, a router, a switch, a bridge, as well other network elements pertaining to various network-related functions, such as billing, security, authentication and authorization, network polices, subscriber profiles, etc.

User device 140 includes one or multiple devices that interface with network 105, present programs to user 150, interface with access network 115, communicate with another user device 140, or some combination thereof. User device 140 includes a communicative and computational device. User device 140 may be implemented as a mobile device, a portable device, or a stationary device. For example, user device 140 may include a display device (e.g., a television, a smart television, a monitor), a set top box (e.g., a client device, a thin client device, a converter box, a receiver, a tuner, a digibox, an IPTV set top box), a server device (e.g., an in-home media server that includes tuners), a mobile device (e.g., a smartphone, a tablet device, a netbook, a phablet, a personal digital assistant, etc.), an in-vehicle infotainment system, a computer (e.g., a desktop computer, a laptop computer, etc.), or other type of end user device (e.g., a wearable device, an Internet access device, etc.).

As illustrated in FIG. 1, user device 140 includes ad agent 142. Ad agent 142 provides various functions pertaining to the native ad service. FIG. 2C is a diagram illustrating exemplary functional components of ad agent 142. Referring to FIG. 2C, ad agent 142 includes an ad manager 210, a voice manager 212, a product manager 214, a sub-audible manager 215, a registration manager 216, a casting manager 218, a notification manager 220, and a user preference manager 222. According to other exemplary embodiments, ad agent 142 may include additional, fewer, and/or different functional components than those illustrated in FIG. 2C and described herein. Additionally, or alternatively, multiple functional components of ad agent 142 may be combined into a single functional component and/or a single functional component may be implemented as multiple functional components in which a process or a function may be collaboratively performed or multiple processes or functions may be split between them. Ad manager 210, voice manager 212, product manager 214, sub-audible manager 215, registration manager 216, casting manager 218, notification manager 220, and/or user preference manager 222 may be connected to and communicate with each other via a link 223.

Ad manager 210 includes logic that provides a graphical user interface pertaining to the native ad service. According to an exemplary implementation, ad manager 210 generates graphical elements of the graphical user interface based on native ad information received during the program. According to another exemplary implementation, graphical elements of the graphical user interface are already included in or with the program.

According to an exemplary embodiment, the graphical user interface includes a product marker. The product marker indicates where the product is during the presentment of the program. For example, the product marker may visually appear on the product. According to an exemplary implementation, the product marker follows the product when the product is moving within the program. For example, the product may be a car that is being driven and is moving across the screen. During this time, the product marker may visually appear on the car while the car moves across the screen. According to an exemplary implementation, only some products have a product marker while other products do not. For example, the product marker may be used when the product is being showcased relative to other products. However, depending on the user preferences, any product may be stored in a container (e.g., a task bar, etc.), as described herein, for later retrieval, cast to a secondary user device (e.g., user device 140-2), etc. According to an exemplary embodiment, the user may store a user preference that prohibits the product marker from appearing on the screen.

Figure 4A:

According to an exemplary embodiment, the graphical user interface includes a native ad indicator. The native ad indicator indicates that at least one product associated with at least one native ad is available for user inquiry, user presentment, or the like. For example, the native ad indicator may visually appear somewhere on the screen during the presentment of the program. As an example, referring to FIG. 4A, a program 405 displayed on user device 140-1 includes a program marker 407 and a native ad indicator 409. According to this example, program marker 407 indicates the product (e.g., a red shirt) that is worn by a golfer. The product marker may follow the golfer for a pre-configured time period corresponding to duration of the native ad.

According to other exemplary embodiments, ad manager 210 may not visually present to user 150 the native ad indicator and/or the product marker. For example, user 150 may store a user preference in which products and product information attributable to native ads and occurring during the program are visually hidden from user 150 but collected and stored by ad manager 210. User 150 may retrieve the stored information any time during the presentment of the program and after the program ends at user device 140-1 and/or at user device 140-2.

Figure 4C:

According to an exemplary embodiment, the graphical user interface includes various interactive graphical elements that allow user 150 to have a commercial interaction with the native ad, the product, and the product information. For example, the graphical user interface may include one or multiple graphical elements (e.g., overlay, menu, window, cursor, pointer, tab, bar, etc.), visual effects (e.g., dissolve, opaque, transparent, pop-up, slide-in, slide-out, etc.), and so forth. The graphical user interface allows user 150 to select and carry out various processes pertaining to the product and the native ad. For example, user 150 can access social media (e.g., Facebook, Twitter, Vimeo, Pinterest, etc.) and share impressions pertaining to the native ad and/or inquiry about and/or comment on the product. Additionally, for example, the graphical user interface allows user 150 to purchase the product, consume product information, access stored products and product information, show and hide native ads, fetch product information, cast product information to secondary user device (e.g., user device 140-2), cast native ad information to the secondary user device, manipulate the presentation of the program with the native ad (e.g., picture-in-picture, view product information to side or bottom of screen, etc.), queue products and product information for subsequent retrieval, and filter products and product information based on user interest. Depending on the type of user device 140, user 150 may interact with graphical user interface using various input mechanisms (e.g., touching a touch screen, a remote control, a mouse, a keyboard, voice, etc.). For example, referring to FIG. 4C, a menu area 419 may include various graphical elements, as described herein.

According to an exemplary implementation, ad agent 142 may operate without user 150 necessarily activating the native ad service. For example, ad agent 142 may operate whenever user device 140 is powered on. According to another exemplary implementation, ad agent 142 may not operate unless user 150 activates the native ad service. For example, ad agent 142 may require user 150 to provide some input.

Voice manager 212 includes speech recognition logic and voice recognition logic on which the voice service is based. The voice service may be activated based on a user input or ubiquitously monitoring for voice commands from user 150 whenever user device 140 is receiving and presenting a program. The speech recognition logic includes natural language processing logic that can receive and interpret words, phrases, sentences, etc., which user 150 uses naturally when addressing another person. For example, user 150 is able to issue vocal commands to voice manager 212 and manage the ad experience. By way of further example, user 150 may ask for information about a product, request to purchase the product, request buying options (e.g., closest to me, lowest cost, longest term, most or least units, discounts, etc.), retrieve product information, display available images of the product, etc. User 150 may interact with the graphical user interface of ad manager 210 via voice manager 212 and may perform various tasks, as previously described, or perform various tasks without the graphical user interface of ad manager 210 being visually present to user 150. For example, when an actress is spraying herself with perfume, user 150 may ask for product information on the perfume. According to another example, while watching a program on user device 140-1, which includes an actor driving a car, user 150 may request that the ad be transmitted from user device 140-1 to user device 140-2, that the ad be queued for later viewing, and/or manipulate ad and/or program presentment.

Ad manager 210 and voice manager 212 allows user 150 to control the presentment of the native ad. For example, user 150 may control a graphical element that acts as a container. User 150 may control the container (e.g., a task bar, etc.) to slide out over part of the screen within which one or multiple images of products may be displayed, and to slide in (e.g., hidden) when desired. For example, referring to FIG. 4B, a container 411 may include various product images, such as a red shirt 413, golf shoes 415, and a book on golf 417. User 150 may move container 411 anywhere on the screen (e.g., top, bottom, left side, right side, etc.). User 150 may select a product displayed within the graphical element, access product information, and so forth. User 150 may move the graphical element to various portions of the screen (e.g., top, bottom, or side). According to an exemplary implementation, when the graphical element is slide out, ad manager 210 will track user queries during the presentment of the ad and/or track user queries even when there is no active ad occurring. Additionally, for example, a user query associated with an ad, such as "buy blue shirt," "obtain information on red sports car," or "car dealers in my area for sports car," will cause ad manager 210 to record or mark (e.g., counter information) the video frames associated with the user query. Ad manager 210 may transmit this information to ad service device 113. Ad service device 113 may store this information and collect similar information from other users. Based on this information, ad service device 113 can determine various performance metrics, such as, for example, how many viewers, service-wide, asked for this product. The performance metric information could be used to drive future ads with an ad partner, have potential use for dynamically offering ads for the same frames in multi-day look-back mode, or with respect to a sports event or VOD content, predictably determine future views of the impression for dynamic ads in future frames. According to another example, user 150 may indicate whether or not a native ad was too invasive or otherwise detracted user 150 from the program. Ad manager 210 may transmit this information to ad service device 113.

The voice recognition logic identifies user 150 from among other users (e.g., family members, friends, guests, etc.) of the native ad service and present the native ad, perform various tasks, etc., based on user preferences associated with user 150.

Product manager 214 includes logic to fetch and store product information from ad product device 112. For example, based on native ad information included in the program (e.g., embedded in the audio data of the program or embedded in the visual data of the program) or with the program (e.g., as metadata of the program, etc.), product manager 214 may fetch product information from ad product device 112. For example, the native ad information may include a product identifier that identifies the product, a service identifier that identifies the service, and a URI of ad product device 112. The native ad information may include a program identifier that identifies the program or a segment of the program during which the native ad is presented or available, geolocation and network location of where the ad was viewed, and primary and secondary device types participating in the ad viewing. However, the native ad information may differ among programs or ads within the same program based on, for example, the type of advertisement (e.g., information only, can buy, social media interactions, etc.) in the program. Nevertheless, sufficient native ad information is provided to user device 140 so that ad agent 142 is able to obtain detailed information and act upon it.

Product manager 214 includes logic that allows user 150 to browse product information at ad product devices 112 and perform various tasks (e.g., purchase a product, etc.). For example, product manager 214 may include a browser or other type of user interface within which user 150 can navigate, search, and interact with information stored at ad product device 112 about a product of interest.

Sub-audible manager 215 includes logic to play sub-audible coding representative of the native ad information. For example, sub-audible manager 215 may be a part of a program player resident on a primary user device (e.g., user device 140-1). Additionally, sub-audible manager 215 includes logic to receive and interpret sub-audible coding via a microphone. For example, sub-audible manager 215 of a secondary user device (e.g., user device 140-2) may receive a sub-audible transmission via the microphone of the secondary user device. By way of further example, referring to FIG. 1, there may not be a link 160-4 between user device 140-1 and user device 140-2 pertaining to a pairing of the user devices 140. Rather, the native ad information may be communicated from user device 140-1 to user device 140-2 using sub-audible codes, as described herein. Sub-audible manager 215 transcodes the sub-audio tones to generate native ad information, such as a product identifier, a URI of ad product device 112, and so forth. Sub-audible manager 215 may provide the native ad information to other components of ad agent 142 (e.g., product manager 214, notification manager 220, etc.) so that further native ad services may be performed.

According to an exemplary implementation, sub-audible manager 215 of a secondary user device (e.g., the program is not played on this device) operates persistently whenever the secondary user device is powered on. Alternatively, the functionality of sub-audible manager 215 may be invoked by the user. According to an exemplary use case, assume the user is sitting in a movie theater to watch a movie. According to this use case, the user's mobile device cannot pair with the movie projector. According to another use case, the user may be sitting at a friend's house in which the set top box does not have pairing capabilities and/or does not even include an ad agent 142. In either case, assume that a speaker system is in place in which the sub-audible codes are played during the program, when present, via the speaker system, and the microphone of the mobile device is able to detect the sub-audible tones and provide them to sub-audible manager 215 of ad agent 142, which is resident on the mobile device. Sub-audible manager 215 decodes, translates, and/or interprets the sub-audible code and ad agent 142 may subsequently perform various tasks, as described herein.

Registration manager 216 includes logic to register a user with the native ad service. For example, various users may use the native ad system, such as a main user (e.g., user 150) and other users (e.g., family member, friend, guest, etc., of the main user). During a registration process, the user may upload user preferences, indicate a secondary user device, etc., with respect to the user. In this way, the native ad service provided via ad agent 142 may be user-specific and customized. Additionally, the native service may be time-limited. For example, assume user 150 is hosting a social gathering in which several friends are going to view a sporting event at user 150's house. User 150 may configure ad agent 142 to accept temporary registration of guest users. For example, user 150 may restrict the native ad service to the pre-game, game, and post-game programming. As each guest arrives on the day of the social gathering, each guest may pair their mobile device, which includes ad agent 142, with the set top box, which includes ad agent 142, and register their mobile devices. According to various implementations, the pairing may include use of a short-range technology (e.g., Bluetooth, etc.) and/or use of a messaging service (e.g., Google hangouts, Apple iMessage, Facebook Messenger, etc.). According to an exemplary implementation, during the registration process, ad agent 142 of the mobile device and ad agent 142 of the set top box may negotiate and select the messaging service and/or other pairing parameters. During the registered time period (e.g., pre-game, game, and post-game), each mobile device may receive native ad information from the set top box and operate according to the user preferences specified by each user. As an example, during the program, ad agent 142 of the set top box may determine whether products presented in the program match any of the user preferences of the main user and the guests. When there is a match, ad agent 142 transmits native ad information, retrieves and transmits product information, provides a notification, etc., to the mobile device associated with the user preference. In this way, each user's ad experience may be different or may be the same (e.g., no filtering of products).

Casting manager 218 includes logic to cast (e.g., transmit) native ad information and/or product information to another user device 140. For example, casting manager 218 of user device 140-1 may transmit native ad information and/or product information to casting manager 218 of user device 140-2. When casting manager 218 receives native ad information and/or product information, various components of ad agent 142 may perform various native ad-related services. For example, product manager 214 may fetch product information from ad product device 112, notification manager 220 may initiate a notification to the user, and so forth. Sub-audible manager 215 may transmit product information (e.g., an identifier) to ad agent 142.

Figure 4D:
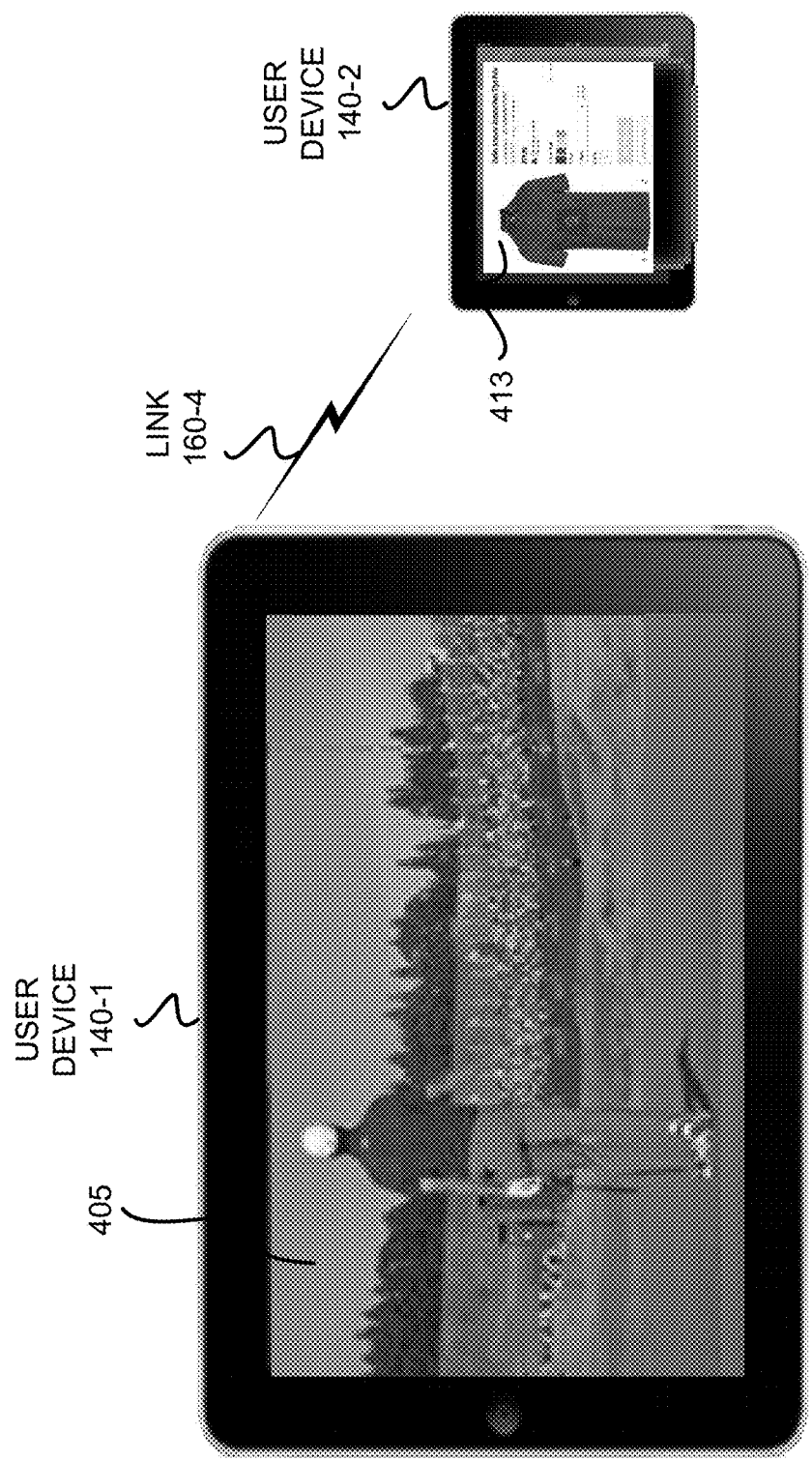

Casting manager 218 includes logic to provide a discovery service for nearby user devices 140 that include ad agent 142. Depending on the capabilities of user device 140, casting manager 218 may use various wireless technologies, such as Bluetooth, near-field communication (NFC), Wi-Fi, ZigBee, ultra wideband (UWB), optical (e.g., Infrared (IR)), an FM technology, or another type of known or future generation communication technology, to establish a communicative coupling with another user device 140. Alternatively, casting manager 218 may cast information via the Internet, etc. For example, referring to FIG. 4D, program 405 is being displayed on user device 140-1. However, according to this example, a product marker and a native ad indicator is not displayed based on a user preference. However, assume that user 150 paired user device 140-2 with user device 140-1, and native ad information was transmitted from user device 140-1 to user device 140-2 via link 160-4. In response to receiving the native ad information, user device 140-2 was configured to fetch product information from ad product device 112. According to this example, product manager 214 fetched product information pertaining to red shirt 413.

Figure 4E:
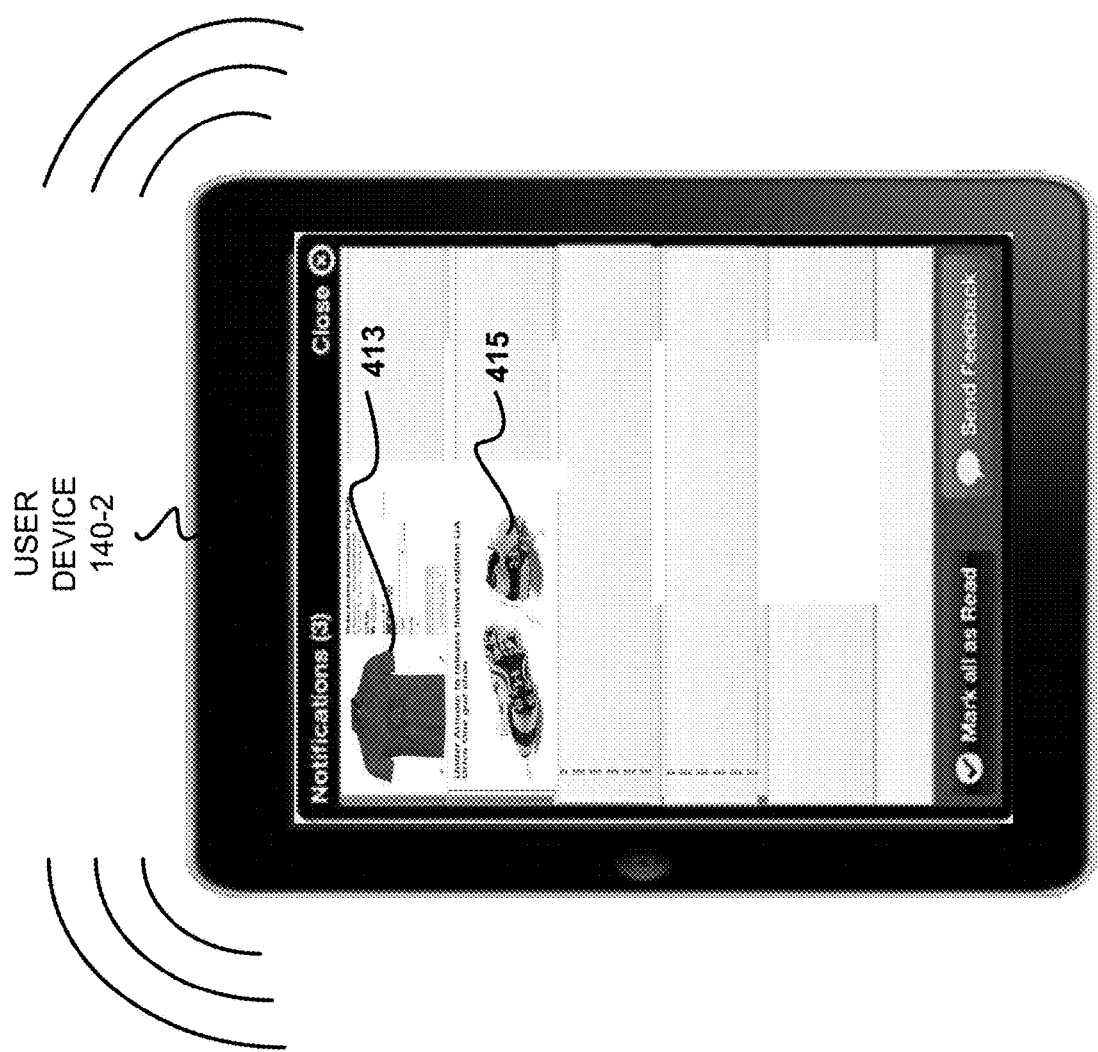

Notification manager 220 includes logic to manage notifications to user 150. For example, notification manager 220 may alert user 150 that an ad is on the screen via user device 140-1 or user device 140-2. Notification 220 may provide the notification visually, auditorily, and/or tactilely. By way of example, notification manager 220 may cause user device 140 to vibrate, flash or pop-up an image of the product via a display, play a video loop (e.g., cut) related to the ad, or cause an auditory cue, flash the screen, and so forth. User 150 may configure the notification (e.g., type (e.g., auditory, etc.), specific cue (e.g., a specific musical tone, etc.), etc.), reason to invoke the notification (e.g., presentment of particular product, etc.), etc., via user preference manager 222. As an example, suppose user 150 is watching a program on a primary user device (e.g., user device 140-1, such as a television) in which native ads are not visually displayed based on user preferences. However, the primary user device is configured to cast native ad information to a secondary device (e.g., user device 140-2) when a certain category of product is advertised. According to this exemplary use case, user device 140-2 may vibrate whenever native ad information for a particular category of product (e.g., clothing) or a particular sub-category of a product (e.g., golf shirts, golf footwear, etc.) included in the program is available. For example, referring to FIG. 4E, user device 140-2 provides a notification (e.g., vibrates) to user 150 each instance a product is available (e.g., red shirt 413 and golf shoes 415).

User preference manager 222 includes logic that obtains and stores user preferences from user 150. Ad agent 142 can provide various native ad services based on the user preferences set by user 150. For example, user preference manager 222 may filter the storage of products presented during the program based on a user preference. For example, during the program, ad manager 210 may store, in the container, images of only certain products (e.g., toddler toys) that may be presented during the program while omitting to store any other images of products. In this regard, while native ads may not be suppressed during the program, only products of interest are stored. According to another example, ad manager 210 may store, in the container, images of products based on other criteria. For example, assume that a certain product is available only for a short time period (e.g., the next five minutes, until the end of the program, etc.), a discount is available for the short time period, etc. Ad manager 210 may store the image of this product first in a queue (e.g., left to right, top to bottom, etc.) relative to other product images, even when the product was not the first product presented during the program. According to an exemplary implementation, ad manager 210 may transmit filtering information to ad service device 113, which may be used to determine future ad focus areas across a demographic, region, programs, etc. The filtering information may be anonymous to preserve user privacy, etc.

Additionally, for example, user preference manager 222 may store a user preference pertaining to various parameters applicable to notifications. Additionally, for example, user preference manager 222 may store a user preference pertaining to the visual elements (e.g., the product marker, the native ad indicator, the container, etc.) in terms of appearance, position, and so forth. Additionally, for example, user preference 222 may store a user preference pertaining to purchasing products, such as credit card account, stores from which to purchase, etc. When a user purchases a product, ad agent 142 may transmit certain information to ad product device 112. For example, the name of the program service provider may be provided so that the program service provider receives credit for steering the user to the retailer's web site. Also, user 150 may set a user preference regarding an automatic gift card, including automatic credit limits on another user's birthday or special calendar days (e.g., once a week/month, a week before school starts, etc.). According to an exemplary implementation, a main user (e.g., user 150 of user device 140-2) may override any user preference associated with another user (e.g., user 150 of user device 140-3) when the main user is detected as present (e.g., by way of voice recognition, pairing with secondary device of the main user, etc.). User preference manager 222 may afford user 150 other options to govern the use of the native ad service, such as parental controls that prohibit certain activities being performed by others, such purchasing a product, obtaining product information, and so forth.

When ad agent 142 is resident on a secondary user device, ad agent 142 may include other functional components, such as to operate as a remote control and allow user 150 to control the native ad service operating on the main user device. Additionally, as previously described, ad agent 142, which is resident on the secondary user device, allows respective users to interact with the native ad service in a manner different from the main user, such as obtaining product information of interest, and so forth. The service provider of the native ad service may also encourage live concurrent viewing of a program among users and exposure to native advertising by sponsoring a trivia contest or commentator/host-driven interaction with social media.

FIG. 3 is a diagram illustrating exemplary components of a device 300. Device 300 may correspond to each network device (e.g., program device 110, ad service device 113, ad bidding device 114, etc.) and user device 140 depicted in environment 100. As illustrated in FIG. 3, according to an exemplary embodiment, device 300 includes a bus 305, a processor 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray® disk (BD), etc.). Memory/storage 315 may store data, software, and/or instructions related to the operation of device 300.

Software 320 includes an application or a program that provides a function and/or a process. Software 320 is also intended to include firmware, middleware, microcode, hardware description language (HDL), and/or other form of instruction. By way of example, with respect to the network devices that include logic to provide the native ad service, these network devices may be implemented to include software 320. Additionally, for example, user device 140 may include software 320 (e.g., ad agent 142) to perform tasks as described herein.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include an antenna. Communication interface 325 may operate according to a protocol stack and a communication standard. Communication interface 325 may include various processing logic or circuitry (e.g., multiplexing/de-multiplexing, filtering, amplifying, converting, error correction, etc.). According to an exemplary embodiment, user device 140 includes multiple communication interfaces 325. For example, user device 140 includes a near field communication interface or other short-range communication interface, which may be used to communicate with other user devices 140 (e.g., primary user device that includes ad agent 142). Additionally, for example, user device 140 includes a long-range communication interface, which may be used to communicate with access network 115, network 105, and so forth.

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 5:
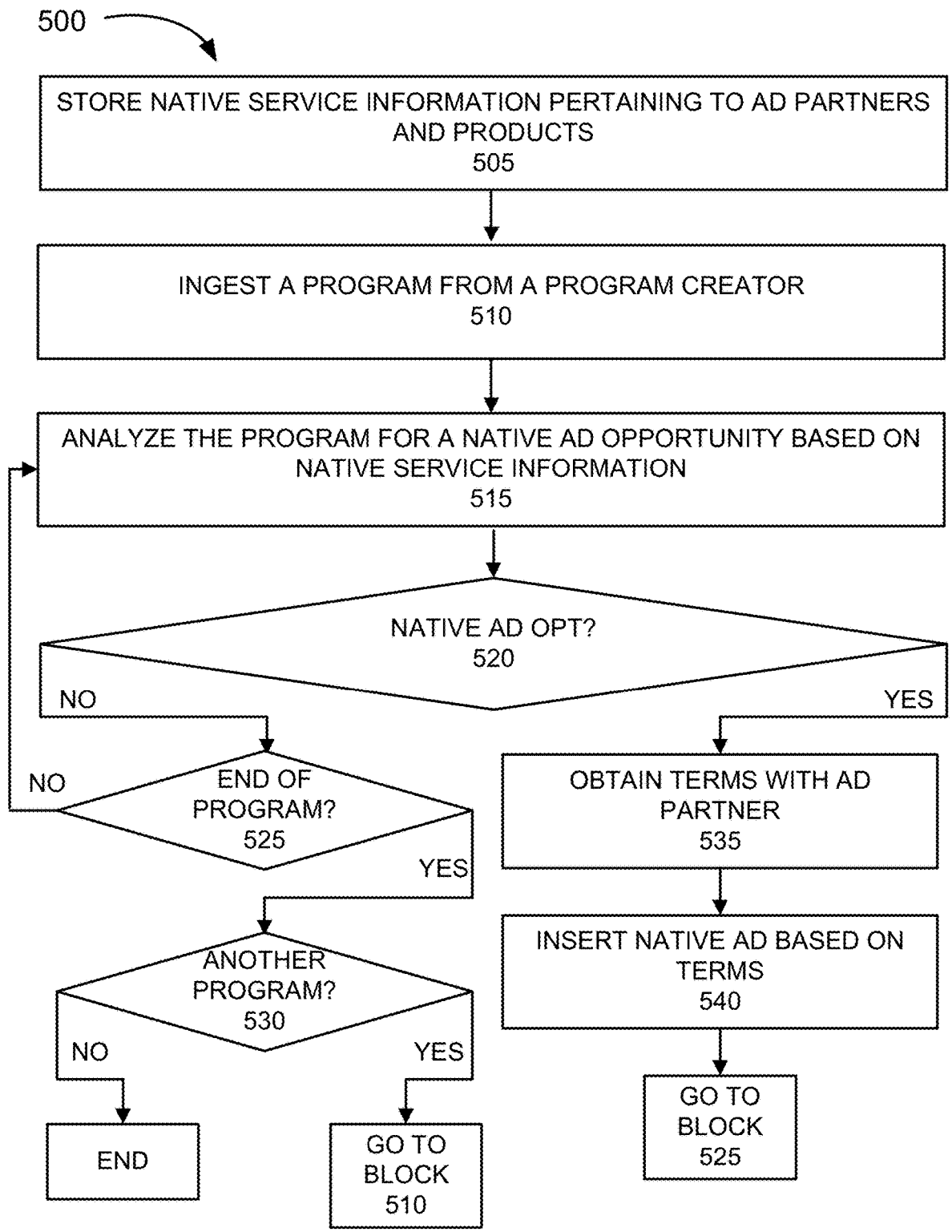
FIGS. 5-9 are flow diagrams illustrating exemplary processes of the native ad system.

FIG. 5 is a flow diagram illustrating an exemplary process 500 pertaining to the native ad system. Process 500 is directed to processes previously described with respect to FIG. 2A and elsewhere in this detailed description pertaining to native ad insertion. According to an exemplary embodiment, ad service device 113 performs the steps of process 500. For example, processor 310 executes software 320 to perform the steps described. As previously described, native ad insertion may be performed in series or in parallel with a transcoding process.

Referring to process 500, in block 505, native service information pertaining to ad partners and products is stored. For example, ad service device 113 stores native service information in a database, as previously described. The native service information may include product information, native ad information, and/or ad correlation information.

In block 510, a program from a program creator is ingested. For example, programs from program creators are stored in a mass storage device. Ad service device 113 selects a program or receives from another network device the program. For example, ad service device 113 may select or receive the program as a part of a transformation process of the program before the program is delivered to users for consumption.

In block 515, the program is analyzed for a native ad opportunity based on the native service information. For example, ad service device 113 analyzes or scans the program to detect whether there any native ad opportunities contained in the program. Ad service device 113 may use various technologies, such as auditory recognition (e.g., voice pattern recognition, voice recognition, speech recognition, etc.), optical character recognition, closed caption recognition, facial recognition, image profile recognition, and/or subliminal optical pattern recognition, to analyze the program.

In block 520, it is determined whether a native ad opportunity is present. For example, ad service device 113 compares native service information with information included in the program and obtained during the analysis to determine whether a native ad opportunity is present in the program.

When it is determined that the native ad opportunity is not present (block 520—NO) it is determined whether it is the end of the program (block 525). For example, ad service device 113 may identify whether the portion of the program analyzed is an end portion of the program. For example, ad service device 113 may use segmentation information associated with the program or other information (e.g., metadata, etc.). When it is determined that it is not the end of the program (block 525—NO), process 500 continues to block 515. For example, ad service device 113 may select another portion of the program to analyze. When it is determined that it is the end of the program (block 525—YES), it is determined whether there is another program (block 530). For example, ad service device 113 may determine whether to select another program based on workflow instructions associated with the native ad service. Alternatively, ad service device 113 may access a queue of programs on which to perform the native ad service.

When it is determined that there is not another program (block 530—NO), process ends. When it is determined that there is another program (block 530—YES), process continues to block 510. When it is determined that the native ad opportunity is present (block 520—YES), terms with the ad partner are obtained (block 535). For example, according to an exemplary implementation, when the native ad opportunity pertains to an unintentional product placement or a new product associated with the ad partner, ad service device 113 determines to invoke the ad bidding service. As previously described, ad service device 113 communicates with ad bidding device 114 to request ad bidding and/or to obtain terms with the ad partner. Ad service device 113 may transmit native service information and other information (e.g., viewership information, transactional information) to ad bidding device 114. As described below in relation to FIG. 6, an ad bidding process may be performed in response to receiving the request from ad service device 113.

In block 540, a native ad is inserted in the program based on the terms. For example, ad service device 113 inserts native ad information with the program. Ad service device 113 uses negotiable terms for presenting an ad, such as estimated viewership or duration of view of the product, which may be stored as master agreement information by master agreement information manager 206. Process 500 may continue to block 525.

Although FIG. 5 illustrates an exemplary process pertaining to the native ad system, according to other embodiments, process 500 may include additional operations, fewer operations, and/or different operations than those illustrated in FIG. 5, and as described herein.

Figure 6:
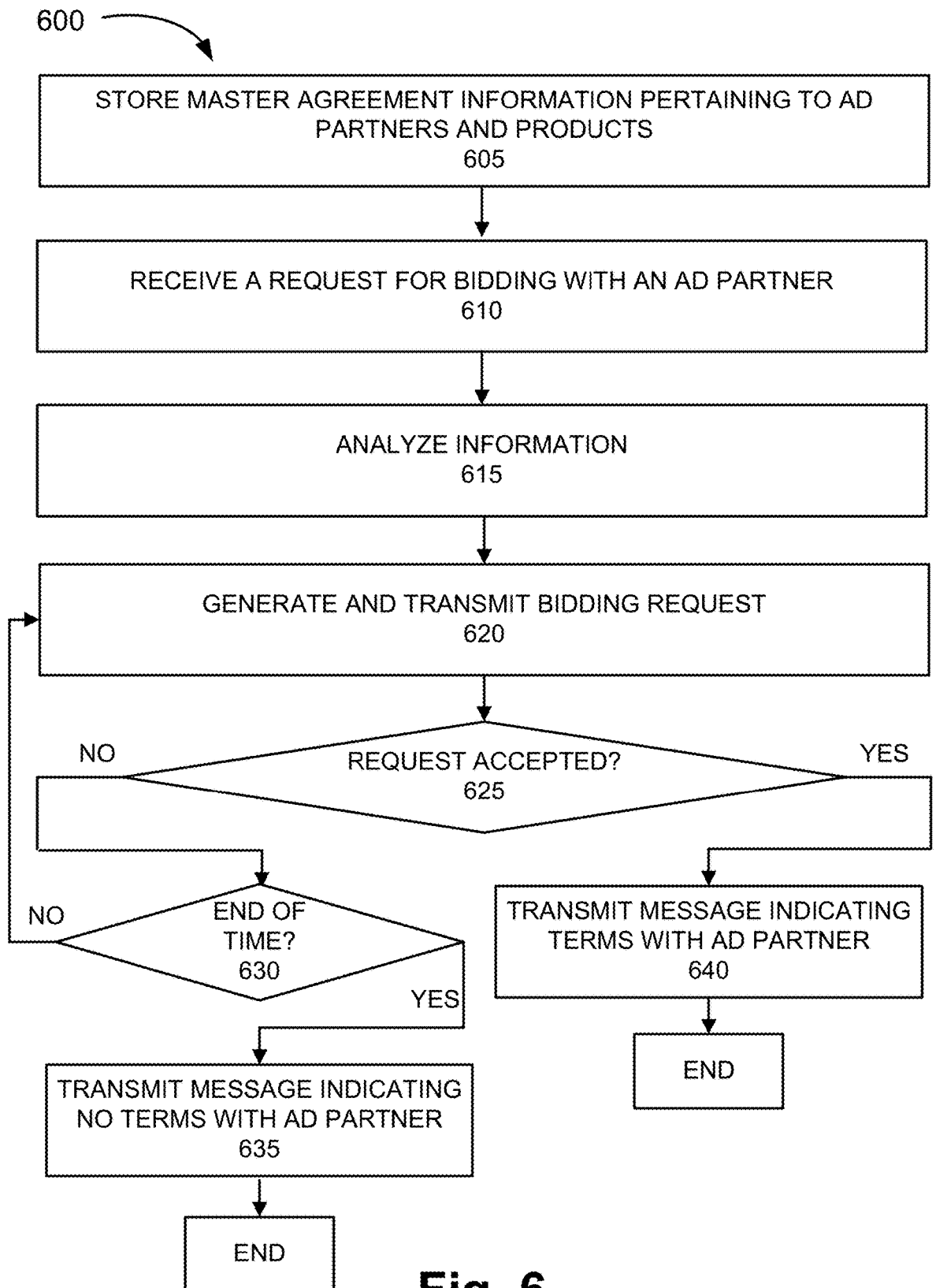

FIG. 6 is a flow diagram illustrating another exemplary process 600 pertaining to the native ad system. Process 600 is directed to processes previously described with respect to FIG. 2B and elsewhere in this detailed description pertaining to ad opportunity bidding. According to an exemplary embodiment, ad bidding device 114 performs the steps of process 600. For example, processor 310 executes software 320 to perform the steps described.

Referring to process 600, in block 605, master agreement information pertaining to ad partners and products is stored. For example, ad bidding device 114 stores master agreement information in a database, as previously described. The master agreement information includes ad bidding parameters. In block 610, a request for bidding with an ad partner is received. For example, ad bidding device 114 receives a request from ad service device 113 to initiate a bidding process associated with a detected native ad opportunity. For example, the request may include one or multiple instances of native service information, as well as viewership information and transactional information.

In block 615, information is analyzed. For example, ad bidding device 114 receives the request and analyzes the information carried in the request. Based on a result of the analysis, ad bidding device 114 selects values for ad bidding parameters. For example, the values of the information received in the request may correlate to particular values or a range of values of the ad bidding parameters. By way of further example, ad bidding device 114 may perform a lookup to match the values of the analyzed information to values associated with the ad bidding parameters.

In block 620, a bidding request is generated and transmitted. For example, ad bidding device 114 generates an offer message that includes the ad bidding parameters and the selected values of the ad bidding parameters. The offer message may include other information (e.g., viewership information, transactional information, etc.). Ad bidding device 114 transmits the offer message to the ad partner's ad bidding device 114

In block 625, it is determined whether the bidding request is accepted. For example, ad bidding device 114 waits to receive an acceptance message, a counter-offer message, or a rejection message from the ad partner's ad bidding device 114. When it is determined that the bidding request is not accepted (block 625—NO), it is determined whether a bidding time has ended (block 630). For example, ad service device 113 may use the transactional information associated with this bidding transaction to determine whether a time limit has expired. When it is determined that the bidding time has not ended (block 630—NO), process 600 continues to block 620. When it is determined that the bidding time has ended (block 630—YES), a message, which indicates that no terms with the ad partner were agreed upon, is transmitted (block 635). For example, ad bidding device 114 transmits a rejection message to ad service device 113 indicating that the ad partner did not accept the native ad opportunity. When it is determined that the bidding request is accepted (block 625—YES), a message, which indicates that terms with the ad partner were agreed upon, is transmitted. For example, ad bidding device 114 transmits an acceptance message to ad service device 113 indicating that the ad partner accepts the native ad opportunity. The acceptance message includes information indicating the terms that were agreed upon.

Although FIG. 6 illustrates an exemplary process pertaining to the native ad system, according to other embodiments, process 600 may include additional operations, fewer operations, and/or different operations than those illustrated in FIG. 6, and as described herein.

Figure 7:
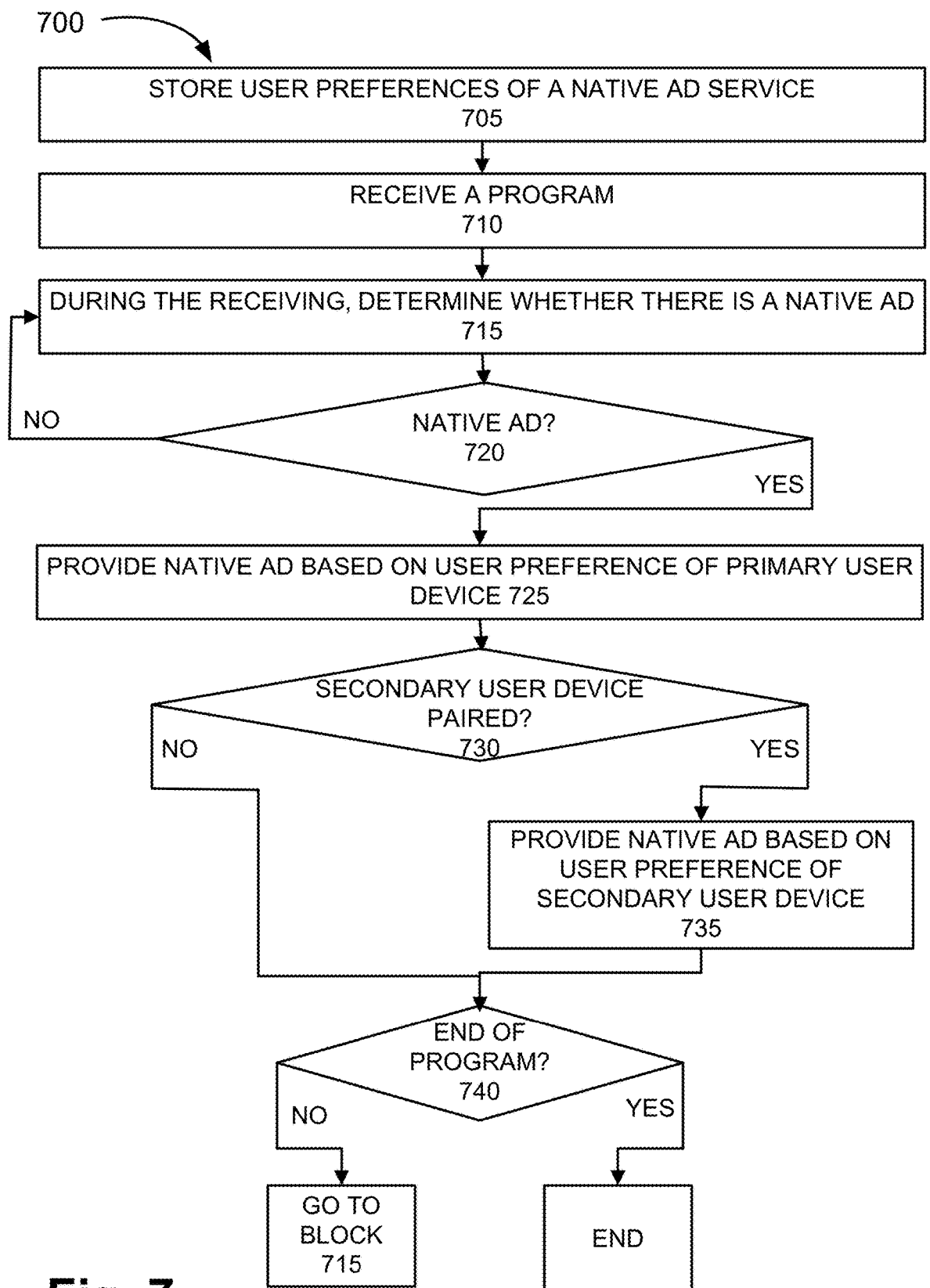

FIG. 7 is a flow diagram illustrating yet another exemplary process 700 pertaining to the native ad system. Process 700 is directed to processes previously described with respect to FIG. 2C and elsewhere in this detailed description pertaining to native advertising. According to an exemplary embodiment, user device 140 performs the steps of process 700. For example, processor 310 executes software 320 to perform the steps described. According to process 700, it is assumed that the primary user device is capable of pairing with a secondary user device.

Referring to process 700, in block 705, user preferences of a native ad service are stored. For example, a primary user device (e.g., user device 140-1) stores user preferences pertaining to the native ad service. The user preferences may include user preferences pertaining to a secondary device (e.g., user device 140-2). The user of the primary user device and/or the secondary user device may be a main user or a user associated with the main user (e.g., family member, friend, guest, etc.).

In block 710, a program is received. For example, user device 140-1 receives a program from program device 110. In block 715, during the receiving of the program, determine whether there is a native ad. For example, user device 140-1 detects whether there is native ad information present. By way of further example, user device 140-1 may detect whether native ad information is embedded in a track of the program (e.g., an audio track, a video track). According to another example, user device 140-1 may detect whether native ad information is being received via a dedicated or additional track or channel associated with the program.

When it is determined that there is not a native ad (block 720—NO), process 700 continues to block 715. For example, user device 140-1 continues to determine whether native ad information is being received. When it is determined that there is a native ad (block 720—YES), the native ad is provided based on a user preference of a primary user device (block 725). For example, as previously described, user device 140-1 may provide the native ad in accordance with the user preferences stored and pertaining to the primary user device. As an example, a product marker and/or a native ad indicator may or may not be displayed during the program. Additionally, for example, user device 140-1 may or may not fetch product information, store an image of the product in a container, generate a notification, perform filtering, etc., based on the user preference of the primary user device, as previously described.

In block 730, it is determined whether a secondary user device is paired. For example, in response to detecting a native ad, user device 140-1 determines whether a secondary user device is paired with user device 140-1. As an example, a user of the secondary user device may register with user device 140-1. Additionally, the secondary user device may upload user preferences pertaining to the native ad service. The user preferences are stored in block 705. Additionally, during the registration process, user device 140-1 and the secondary user device may pair with each other. This information may be stored by user device 140-1.

When it is determined that there is not a secondary user device paired (block 730—NO), it is determined whether the program has ended (block 740). For example, user device 140-1 may determine whether the program has ended based on the program data being received. When it is determined that the program has not ended (block 740—NO), process 700 continues to block 715. When it is determined that the program has ended (block 740—YES), process 700 ends.

When it is determined that there is a secondary user device paired (block 730—YES), the native ad is provided based on a user preference of the secondary user device (block 735). For example, user device 140-1 may or may not transmit the native ad information to the secondary user device, transmit a notification, fetch product information, transmit the product information, etc., based on the user preference of the secondary user device, as previously described. Process 700 continues to block 740.

Although FIG. 7 illustrates an exemplary process pertaining to the native ad system, according to other embodiments, process 700 may include additional operations, fewer operations, and/or different operations than those illustrated in FIG. 7, and as described herein. For example, user device 140-1 may play a sub-audible code representative of the native ad information when it is determined that the native ad is present. According to an exemplary implementation, user device 140-1 may play the sub-audible code, regardless of whether a secondary user device is registered or paired with user device 140-1, because the sub-audible code may be embedded in the audio track of the program. For example, when the program includes stereo channels (e.g., left and right), the sub-audible code may be embedded in both channels. According to another example, when the program includes 5.1 surround or 7.1 surround, the sub-audible code may be embedded in a subwoofer channel and/or other suitable channel. According to another exemplary implementation, user device 140-1 may not play the sub-audible code when there is a secondary user device paired with user device 140-1. For example, when the native ad information is embedded in a dedicated audio track, user device 140-1 may omit to play the dedicated audio track. According to yet another exemplary implementation, user device 140-1 may not determine whether a native ad is present (e.g., in blocks 715 and 720). As an example, when the native ad information is carried by sub-audible code in an audio track of the program, user device 140-1 may simply play the sub-audible code. Also, user device 140-1 may or may not store user preferences and/or determine whether a secondary user device is paired with user device 140-1 (e.g., in blocks 725 and 730). In this way, the primary user device may serve as an intermediary device to delivery native advertising to a secondary user device which may lack certain capabilities (e.g., to pair with the primary user device, etc.). In turn, the secondary user device may decide to pursue or ignore the native advertising received based on any user preferences stored at the secondary user device.

Figure 8:
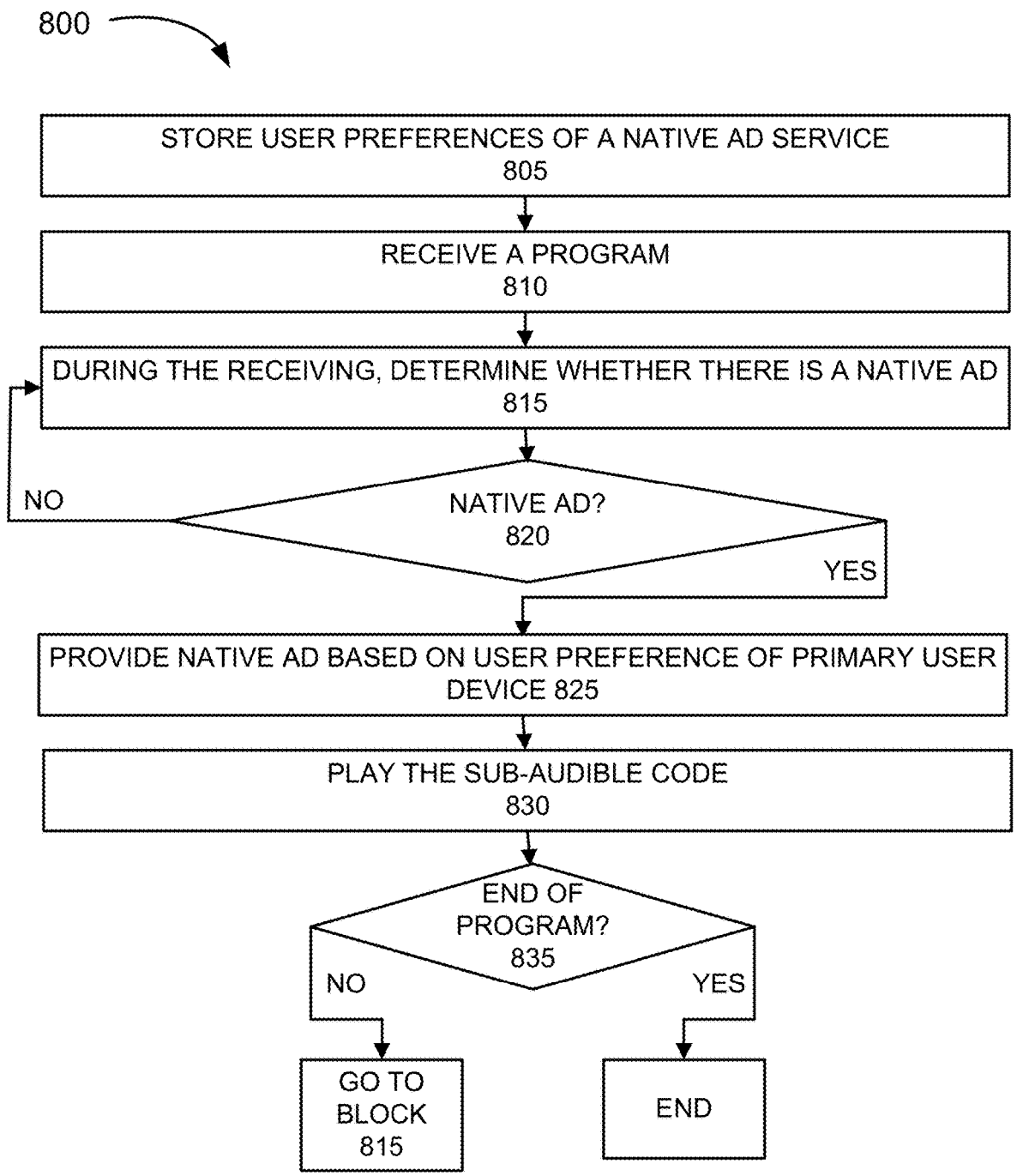

FIG. 8 is a flow diagram illustrating yet another exemplary process 800 pertaining to the native ad system. Process 800 is directed to processes previously described with respect to FIG. 2C and elsewhere in this detailed description pertaining to native advertising. According to an exemplary embodiment, user device 140 performs the steps of process 800. For example, processor 310 executes software 320 to perform the steps described. According to process 800, it is assumed that the primary user device is incapable of pairing with a secondary user device.

Referring to process 800, in block 805, user preferences of a native ad service are stored. For example, a primary user device (e.g., user device 140-1) stores user preferences pertaining to the native ad service. In block 810, a program is received. For example, user device 140-1 receives a program from program device 110. In block 815, during the receiving of the program, determine whether there is a native ad. For example, user device 140-1 detects whether there is native ad information present. By way of further example, user device 140-1 may detect whether native ad information is embedded in a track of the program (e.g., an audio track, a video track). According to another example, user device 140-1 may detect whether native ad information is being received via a dedicated track or channel associated with the program.

When it is determined that there is not a native ad (block 820—NO), process 800 continues to block 815. For example, user device 140-1 continues to determine whether native ad information is being received. When it is determined that there is a native ad (block 820—YES), the native ad is provided based on a user preference of a primary user device (block 825).

In block 830, the sub-audible code is played. For example, user device 140-1 plays the sub-audible code that is representative of the native ad information. In block 835, it is determined whether the program has ended. For example, user device 140-1 may determine whether the program has ended based on the program data being received. When it is determined that the program has not ended (block 835—NO), process 800 continues to block 815. When it is determined that the program has ended (block 835—YES), process 800 ends.

Although FIG. 8 illustrates an exemplary process pertaining to the native ad system, according to other embodiments, process 800 may include additional operations, fewer operations, and/or different operations than those illustrated in FIG. 8, and as described herein.

Figure 9:
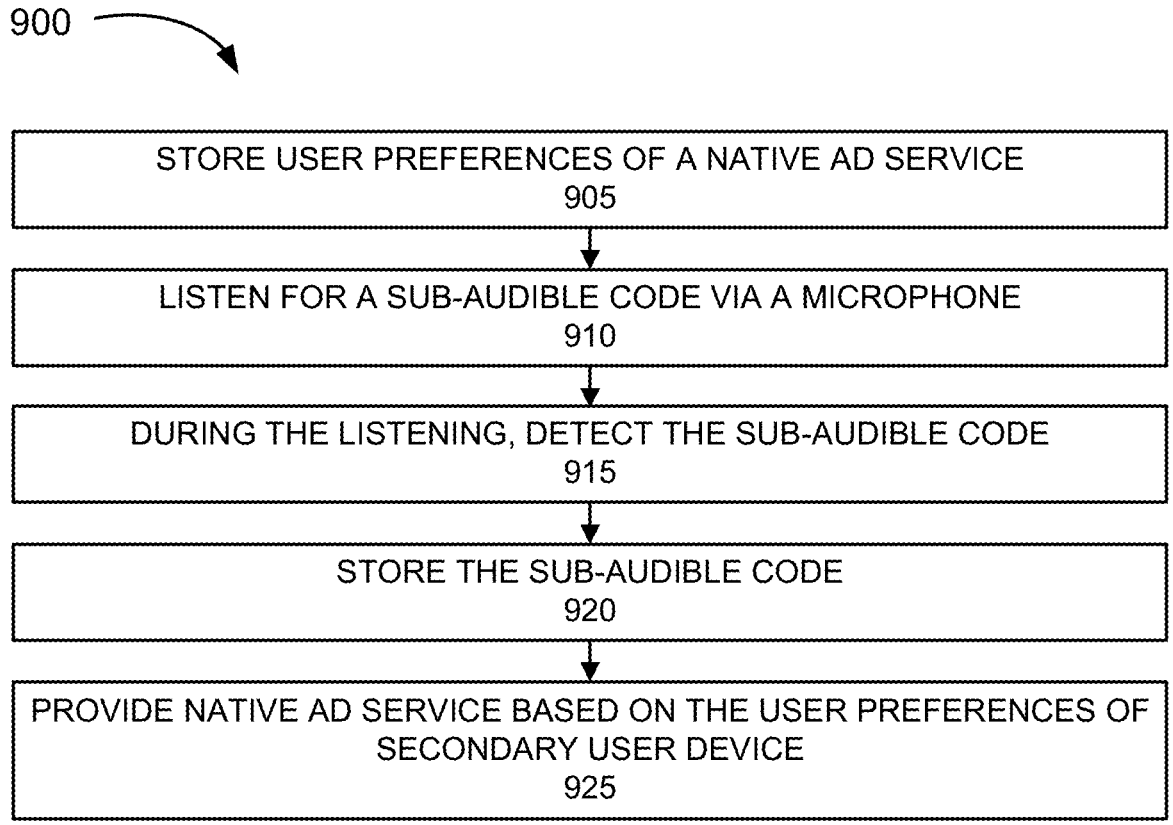

FIG. 9 is a flow diagram illustrating still another exemplary process 900 pertaining to the native ad system. Process 900 is directed to processes previously described with respect to FIG. 2C and elsewhere in this detailed description pertaining to native advertising. According to an exemplary embodiment, user device 140 performs the steps of process 900. For example, processor 310 executes software 320 to perform the steps described. According to process 900, a secondary user device is unable to pair with a primary user device. It may be assumed that the secondary user device includes a microphone having a frequency response suitable to detect the sub-audible codes.

Referring to process 900, in block 905, user preferences of a native ad service are stored. For example, a secondary user device (e.g., user device 140-2) stores user preferences pertaining to the native ad service. In block 910, sub-audible codes are listened for via a microphone. For example, user device 140-2 listens for sub-audible codes being played during the presentation of a program. In block 915, during the listening, a sub-audible code is detected. For example, the microphone of user device 140-2 detects a pattern of tones representative of native ad information. In block 920, the sub-audible code is stored. For example, user device 140-2 translates the sub-audible tones to native ad information. In block 925, the native ad service is provided based on the user preferences of the secondary device. For example, user device 140-2 may or may not notify the user of user device 140-2 about the native ad, fetch product information, queue the product, etc., based on the user preferences of the secondary user device, as previously described.

Although FIG. 9 illustrates an exemplary process pertaining to the native ad system, according to other embodiments, process 900 may include additional operations, fewer operations, and/or different operations than those illustrated in FIG. 9, and as described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary," as used herein means "serving as an example." Any embodiment or implementation described as "exemplary" is not necessarily to be construed as preferred or advantageous over other embodiments or implementations.

In addition, while series of blocks have been described with regard to the processes illustrated in FIGS. 5-9, the order of the blocks may be modified according to other embodiments. Further, non-dependent blocks may be performed in parallel or simultaneously. For example, according to an exemplary implementation, two or more operations may be performed using parallel processing or a multitasking procedure. Additionally, other processes described in this description may be modified and/or non-dependent operations may be performed in parallel or simultaneously.

The embodiments described herein may be implemented in many different forms of software executed by hardware. For example, a process or a function may be implemented as "logic" or as a "component." The logic or the component may include, for example, hardware (e.g., processor 310, a sensor, etc.), or a combination of hardware and software (e.g., software 320). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow and various obvious modifications and equivalent arrangements. The specification and the drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 310) of a computational device. A non-transitory storage medium includes one or more of the storage mediums described in relation to memory/storage 315.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the specification or illustrated in the drawings should be construed as critical or essential to the embodiments described herein unless explicitly described as such.

What is claimed is:

1. A method comprising:
   storing, by a first user device, user preferences pertaining to a native ad service;
   receiving, by the first user device, a program including audio and video, wherein the program is not an advertisement or a commercial, and program data of the program includes one or more instances of native ad information corresponding to one or more instances of native ads;
   displaying or causing to be displayed, by the first user device, the program;
   determining, by the first user device, during the receiving, whether one of the one or more instances of native ad information is received;
   providing, by the first user device, a native ad based on the user preferences, in response to determining that the one of the one or more instances of native ad information is received;

determining, by the first user device, that the first user device is not communicatively paired with a secondary user device, and playing, by the first user device, a sub-audible code representative of the one of the one or more instances of native ad information in response to the determination that the first user device is not communicatively paired with the secondary user device, wherein the sub-audible code includes a time-shift parameter indicating a time-shift period relative to an insertion time of the program data indicating the start of the one of the one or more instances of native ad information.

2. The method of claim 1, wherein the user preferences include first user preferences pertaining to the first user device and the native ad service, and second user preferences pertaining to the secondary user device and the native ad service, wherein the secondary user device is a mobile device.

3. The method of claim 1, wherein the one of the one or more instances of the native ad information includes a product identifier of a product pertaining to one of the one or more instances of the native ads, a uniform resource identifier of a network device that stores product information of the product, or the uniform resource identifier that includes the product identifier.

4. The method of claim 3, wherein the one of the one or more instances of the native ad information is embedded in one of audio data included in the program data or visual data included in the program data.

5. The method of claim 1, wherein providing, by the first user device, the native ad based on the user preferences comprises:

displaying or causing to be displayed a product marker that indicates a product included in the program as a product pertaining to one of one of the one or more instances of the native ads, wherein the product marker is displayed on the product included in the program; and displaying or causing to be displayed a native ad indicator that indicates that one of the one or more instances of the native ads is currently being presented.

6. The method of claim 5, wherein providing, by the first user device, the native ad based on the user preferences comprises:

fetching product information pertaining to the product pertaining to the one of the one or more instances of the native ads, from a network device, in response to determining that the one of the one or more instances of native ad information is received; and storing the product information at the first user device.

7. The method of claim 1, wherein the time-shift parameter indicates a time to play the sub-audible code after the one of the one or more instances of native ad information is completed or before the one of the one or more instances of native ad information begins.

8. The method of claim 1, wherein the first user device is a set top box, an in-home media server, or a television.

9. A device comprising:

a first communication interface;

a second communication interface;

a memory, wherein the memory stores instructions; and a processor, wherein the processor executes the instructions to:

store user preferences pertaining to a native ad service;

receive, via the first communication interface, a program including audio and video, wherein the program is not an advertisement or a commercial, and program information of the program includes one or more instances of native ad information corresponding to one or more instances of native ads;

present or cause to be presented the program to a user as the program is received;

determine, during the presentation of the program, whether one of the one or more instances of native ad information is received;

provide a native ad based on the user preferences, in response to a determination that the one of the one or more instances of native ad information is received;

determine that the device is not communicatively paired with another device; and play a sub-audible code representative of the one of the one or more instances of native ad information in response to the determination that the device is not communicatively paired with the other device, wherein the sub-audible code includes a time-shift parameter indicating a time-shift period relative to an insertion time of the program data indicating when the start of the one of the one or more instances of native ad information.

10. The device of claim 9, wherein the user preferences include first user preferences pertaining to the device and the native ad service, and second user preferences pertaining to the other device and the native ad service, wherein the other device is a mobile device, and wherein the device further comprises:

a display, and wherein, when presenting the program, the processor further executes the instructions to:

present the program via the display.

11. The device of claim 10, wherein the processor further executes the instructions to:

receive, via the second communication interface, registration information from the other device pertaining to the native ad service;

receive, via the second communication interface, the second user preferences; and store the second user preferences in response to the receipt of the second user preferences.

12. The device of claim 9, wherein the time-shift parameter indicates a time to play the sub-audible code after the one of the one or more instances of native ad information is completed or before the one of the one or more instances of native ad information begins.

13. The device of claim 9, wherein, when providing the native ad, the processor further executes the instructions to:

display or cause to be displayed a product marker that indicates a product included in the program as a product pertaining to one of one of the one or more instances of the native ads, wherein the product marker is displayed on the product included in the program; and display or cause to be displayed a native ad indicator that indicates that one of the one or more instances of the native ads is currently being presented.

14. The device of claim 13, wherein, when providing the native ad, the processor further executes the instructions to:

fetch, via the first communication interface, product information pertaining to the product pertaining to the one of the one or more instances of the native ads, from a network device, in response to the determination that the one of the one or more instances of native ad information is received; and store the product information.

15. The device of claim 9, wherein, when providing the native ad, the processor further executes the instructions to:
store an image of a product, which is included in the program and is a product of one of the one or more instances of the native ad, in a graphical element of the native ad service, wherein the graphical element can be visually hidden from the user or visually appear to the user in response to voice commands from the user.

16. A non-transitory computer-readable storage medium that stores instructions executable by a processor of a computational device, which when executed cause the computational device to:
store user preferences pertaining to a native ad service;
receive a program including audio and video, wherein the program is not an advertisement or a commercial, and program information of the program includes one or more instances of native ad information corresponding to one or more instances of native ads;
present or cause to be presented the program to a user as the program is received;
determine, during the presentation of the program, whether one of the one or more instances of native ad information is received;
provide a native ad based on the user preferences, in response to a determination that the one of the one or more instances of native ad information is received;
determine that the computational device is not communicatively paired with another device; and
play a sub-audible code representative of the one of the one or more instances of native ad information in response to the determination that the computational device is not communicatively paired with the other device, wherein the sub-audible code includes a time-shift parameter indicating a time-shift period relative to an insertion time of the program data indicating the start of the one of the one or more instances of native ad information.

17. The non-transitory, computer-readable storage medium of claim 16, wherein the one of the one or more instances of the native ad information includes a product identifier of a product pertaining to one of the one or more instances of the native ads, a uniform resource identifier of a network device that stores product information of the product, or the uniform resource identifier that includes the product identifier.

18. The non-transitory, computer-readable storage medium of claim 16, wherein the instructions further comprise instructions to:
fetch product information pertaining to a product of one of the one or more instances of the native ads, from a network device, in response to the determination that the one of the one or more instances of native ad information is received; and
store the product information.

19. The non-transitory, computer-readable storage medium of claim 16, wherein the instructions to provide further comprise instructions to:
generate a notification to the user that the one of the one or more instances of native ad information is received.

20. The non-transitory, computer-readable storage medium of claim 16, wherein the one of the one or more instances of the native ad information includes a product identifier of a product of one of the one or more instances of the native ads, wherein the instructions to provide further comprise instructions to:
determine whether the product is to be filtered based on the user preferences; and
discard the one of the one or more instances of the native ad information in response to a determination that the product is to be filtered.

* * * * *